United States Patent
Ueno et al.

(10) Patent No.: US 7,400,967 B2
(45) Date of Patent: Jul. 15, 2008

(54) CONTROL SYSTEM FOR INTERNAL COMBUSTION ENGINE

(75) Inventors: Masaki Ueno, Wako (JP); Katsuji Wada, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 38 days.

(21) Appl. No.: 11/650,948

(22) Filed: Jan. 9, 2007

(65) Prior Publication Data

US 2007/0174003 A1    Jul. 26, 2007

(30) Foreign Application Priority Data

Jan. 20, 2006    (JP)    ............................. 2006-012777

(51) Int. Cl.
  *G06F 19/00* (2006.01)
  *F02D 11/10* (2006.01)
(52) U.S. Cl. ..................... 701/104; 701/105; 701/108; 123/295; 123/399
(58) Field of Classification Search ......... 701/101–105, 701/115, 108; 123/295, 399, 478, 480, 568.21; 73/119 A, 118.2
See application file for complete search history.

(56) References Cited

U.S. PATENT DOCUMENTS

| | | | |
|---|---|---|---|
| 4,578,996 A * | 4/1986 | Abe et al. ................... | 73/118.2 |
| 4,785,786 A * | 11/1988 | Nagao et al. ................. | 123/488 |
| 5,369,586 A * | 11/1994 | Bridgens ...................... | 701/86 |
| 6,032,640 A * | 3/2000 | Evans .......................... | 123/295 |
| 6,058,906 A * | 5/2000 | Yoshino ....................... | 123/295 |
| 6,073,610 A * | 6/2000 | Matsumoto et al. .......... | 123/396 |
| 6,155,230 A * | 12/2000 | Iwano et al. ............ | 123/339.16 |
| 6,351,943 B1 * | 3/2002 | Tagami et al. ................. | 60/285 |

FOREIGN PATENT DOCUMENTS

| | | |
|---|---|---|
| EP | 0 409 247 A2 | 7/1990 |
| EP | 0 882 879 A2 | 12/1998 |
| EP | 1 241 336 A2 | 9/2002 |
| JP | 8-061112 A | 3/1996 |
| WO | WO 2004/044406 A1 | 5/2004 |

* cited by examiner

*Primary Examiner*—Willis R. Wolfe, Jr.
*Assistant Examiner*—Johnny H. Hoang
(74) *Attorney, Agent, or Firm*—Arent Fox LLP

(57) ABSTRACT

A control system for an internal combustion engine having at least one fuel injection valve for injecting fuel to an intake pipe or a combustion chamber of the engine. Intake gas state parameters indicative of a state of the intake gases supplied to the engine are detected. Demand values of the intake gas state parameters are calculated according to operating condition parameters indicative of an operating condition of the engine. The intake gas state is controlled so that the intake gas state parameters coincide with the demand values. A control value is then calculated according to the operating condition parameters and deviations of the intake gas state parameters from the demand values. Accordingly, an amount of fuel injected by the at least one fuel injection valve is controlled according to the control value.

22 Claims, 19 Drawing Sheets

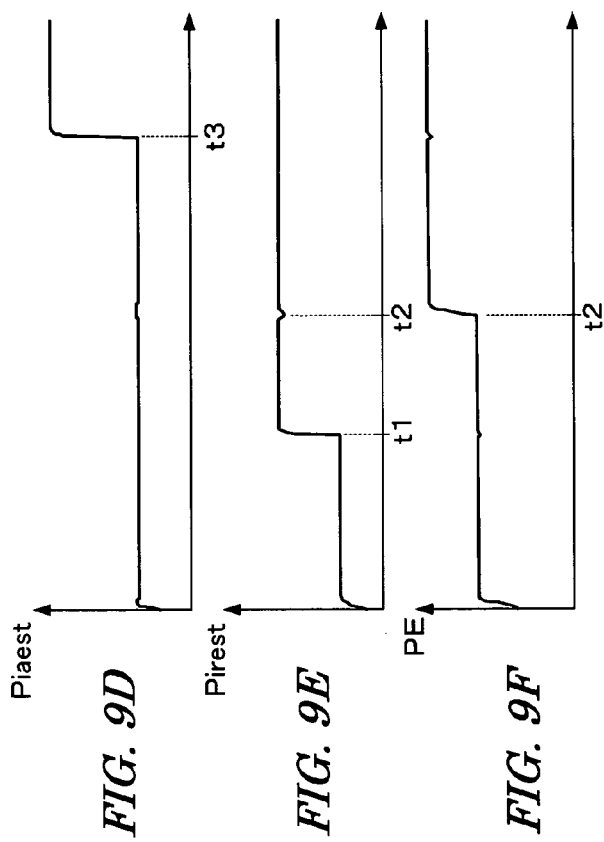
FIG. 9D
FIG. 9E
FIG. 9F
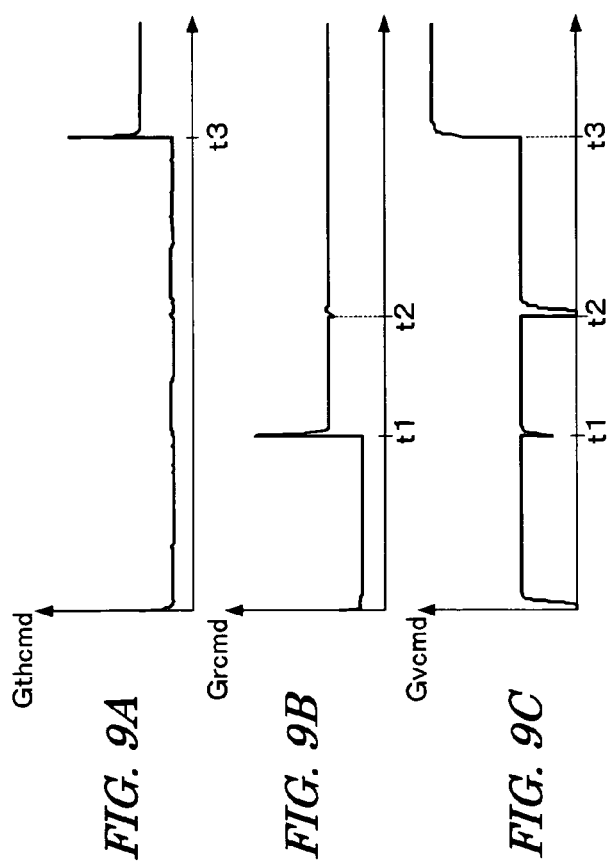
FIG. 9A
FIG. 9B
FIG. 9C

CONTROL SYSTEM FOR INTERNAL COMBUSTION ENGINE

BACKGROUND OF THE INVENTION

1. Field of the Invention

The present invention relates to a control system for an internal combustion engine and, particularly, to a control system that accurately controls an air-fuel ratio in a combustion chamber of the internal combustion engine having an exhaust gas recirculation mechanism.

2. Description of the Related Art

Japanese Patent Laid-open No. H08-61112 discloses a control system for a diesel engine having an exhaust gas recirculation mechanism. According to the disclosed control system, a gas amount Gf supplied to a combustion chamber is calculated using a map which is set according to a depressed amount of an accelerator and an engine rotational speed, and an intake air amount Ga is detected by an intake air amount sensor. Further, the intake air amount Ga is subtracted from the gas amount Gf to calculate a recirculated gas flow rate Ge. An air amount Gae in exhaust gases recirculated through the exhaust gas recirculation mechanism is calculated according to the recirculated gas amount Ge and an oxygen concentration OX in the exhaust gases detected by an oxygen concentration sensor provided in the exhaust system. An air amount Gcyl supplied to the combustion chamber is calculated as (Ga+Gae), and a fuel injection amount is calculated according to the air amount Gcyl.

With respect to the internal combustion engine, especially to the diesel engine, an emission amount of NOx or particulate matter (PM) has been strictly regulated in recent years. Accordingly, it is extremely difficult to obtain the required performance using the conventional control method which supplies an excessive amount of air compared to the fuel supply amount. Therefore, it is necessary to appropriately control the intake air amount of the engine and the air-fuel ratio of the air-fuel mixture in the combustion chamber.

In the conventional control system described above, a technique, wherein a target value of the intake air amount is set according to an engine operating condition and the actual intake air amount is controlled based on the target value, is not implemented. Consequently, according to the conventional control system, in recent years it has been difficult to perform the intake air amount control and the fuel supply control which satisfy a strict demand of the engine performance.

SUMMARY OF THE INVENTION

An aspect of the present invention is to provide a control system for an internal combustion engine, which more strictly controls the intake gas state and the air-fuel ratio of an air-fuel mixture in an internal combustion engine, wherein good operating performance and exhaust characteristics are obtained.

To attain the above-described aspect, the present invention provides a control system for an internal combustion engine having fuel injection means for injecting fuel to an intake pipe or a combustion chamber of the engine. The control system includes intake gas state parameter detecting means, demand value calculating means, intake gas state control means, and fuel injection control means. The intake gas state parameter detecting means detects intake gas state parameters (GA, PI) which are indicative of a state of intake gases supplied to the engine. The demand value calculating means calculates demand values (Giades, Pides) of the intake gas state parameters according to operating condition parameters (NE, TRQ) which are indicative of an operating condition of the engine. The intake gas state control means controls the intake gas state so that the intake gas state parameters (GA, PI) coincide with the demand values (Giades, Pides). The fuel injection control means calculates a control value (Mfcmd) according to the operating condition parameters (NE, TRQ) and deviations ($\delta$Ga, $\delta$Pi) of the intake gas state parameters from the demand values and controls an amount of fuel injected by the fuel injection means according to the control value (Mfcmd).

With the above-described structural configuration, the intake gas state parameters indicative of the state of the intake gases supplied to the engine are detected, and the demand values of the intake gas state parameters are calculated according to the operating condition parameters indicative of the operating condition of the engine. Further, the intake gas state is controlled so that the intake gas state parameters coincide with the demand values, and the fuel injection amount is controlled according to the operating condition parameters and the deviations of the intake gas state parameters from the demand values. Therefore, the desired intake gas state according to the engine operating condition is realized, and the control of the fuel injection amount suitable for the intake gas state is performed, wherein good engine operating performance and exhaust characteristics are obtained.

Preferably, the fuel injection control means controls a fuel injection timing ($\phi$fcmd) of the fuel injection means according to the operating condition parameters (NE, TRQ) and the deviations ($\delta$Ga, $\delta$Pi) of the intake gas state parameters from the demand values.

With the above-described structural configuration, the fuel injection timing of the fuel injection means is controlled according to the operating condition parameters and the deviations of the intake gas state parameters from the demand values. Therefore, fuel injection timing control suitable for the intake gas state, realized by the intake gas state control, is performed, wherein good engine operating performance and exhaust characteristics are obtained.

Preferably, the fuel injection control means includes basic control value calculating means, change rate parameter calculating means, correction value calculating means, and control value calculating means. The basic value calculating means calculates a basic control value (Mfmap) according to the operating condition parameters (NE, TRQ). The change rate parameter calculating means calculates change rate parameters (Dmfga, Dmfpi) indicative of change rates of the basic control value according to the operating condition parameters (NE, TRQ). The correction value calculating means calculates correction values ($\delta$Ga×Dmfga, $\delta$Pi×Dmfpi) by multiplying the change rate parameters (Dmfga, Dmfpi) by the deviations ($\delta$Ga, $\delta$Pi) of the intake gas state parameters from the demand values. The control value calculating means calculates the control value (Mfcmd) of the fuel injection amount by correcting the basic control value with the correction values ($\delta$Ga×Dmfga, $\delta$Pi×Dmfpi). The fuel injection control means performs the fuel injection control according to the control value (Mfcmd) calculated by the control value calculating means.

With the above-described structural configuration, the basic control value and the change rate parameters indicative of the change rates of the basic control value are calculated according to the operating condition parameters. Also, the correction values are calculated by multiplying the change rate parameters by the deviations of the intake gas state parameters from the demand values. The control value of the fuel injection amount is calculated by correcting the basic control value with the correction values, and fuel injection control is performed according to the calculated control value. Therefore, an appropriate control value corresponding to the deviations is obtained even if the intake gas state parameters do not completely coincide with the demand values and accurate fuel injection control is performed. Further, since the correction values are calculated by multiplying the change rate parameters by the deviations, the number of set-points in the map used for calculating the fuel injection amount that is suitable for the actual intake gas state parameter values is reduced. Accordingly, accurate fuel injection control is realized, suppressing the memory capacity and the manpower for setting the map.

Preferably, the intake gas state parameters are any two of an intake pressure (PI), an intake oxygen partial pressure (PIO), and an intake inert gas partial pressure (PII). If the engine has an exhaust gas recirculation mechanism for recirculating exhaust gases to an intake system, the intake state parameters are any two of the intake pressure (PI), an intake fresh air flow rate (GA), and a flow rate (GR) of recirculated exhaust gases.

By using the above-listed intake gas state parameters, it is possible to control an amount of masses of oxygen and inert gases (gases other than oxygen) in the combustion chamber to the desired values, thereby performing appropriate and accurate fuel injection control.

Preferably, an intake gas temperature (TI) is further included in the intake gas state parameters, wherein the control system further includes intake gas temperature reference value calculating means for calculating a reference value (Tinorm) of the intake gas temperature. As such, the fuel injection control means performs the fuel injection control according to a deviation ($\delta$Ti) of a detected intake gas temperature (TI) from the reference value (Tinorm).

With the above-described structural configuration, the intake gas state parameters further include the intake gas temperature. Therefore, the fuel injection control is performed in view of any influence from changes in the intake gas temperature, thereby improving accuracy of the fuel injection control.

Preferably, the control system further includes combustion mode determining means for determining a combustion mode (Mdcmb) of the engine according to the operating condition parameters, wherein the fuel injection control means calculates the control value (Mfcmd) using a control map set corresponding to the combustion mode.

With the above-described structural configuration, the combustion mode of the engine is determined according to the operating condition parameter, and a calculation of the control value is performed using the control map which is set corresponding to the determined combustion mode. That is, a plurality of the combustion modes, which are different in the air-fuel ratio or the fuel injection timing, are selected according to the engine operating condition, and the control map corresponding to the selected combustion mode is used. Accordingly, the optimal control value is obtained corresponding to each combustion mode.

Preferably, when the combustion mode determining means changes the combustion mode (Mdcmd), the fuel injection control means uses the control map corresponding to the combustion mode before the change if at least one of the absolute values of the deviations ($\delta$Ga, $\delta$Pi) is equal to or greater than a predetermined threshold value ($\epsilon$ga2, $\epsilon$ga3, $\epsilon$i2, $\epsilon$pi3). Also, the fuel injection control means uses the control map corresponding to the changed combustion mode if each of the absolute values of the deviations ($\delta$Ga, $\delta$Pi) is less than the predetermined threshold value ($\epsilon$ga2, $\epsilon$ga3, $\epsilon$pi2, $\epsilon$pi3).

With the above-described structural configuration, when the combustion mode is changed, the control map corresponding to the combustion mode before the change is used if at least one of the absolute values of the deviations of the intake gas state parameters from the demand values is equal to or greater than the predetermined threshold value, and the control map corresponding to the changed combustion mode is used if each of the absolute values of the deviations of the intake gas state parameters is less than the predetermined threshold value. In the transient state immediately after the combustion mode change, the deviations of the actual intake gas state parameters from the demand values are likely to become large. Therefore, the control map corresponding to the combustion mode before the change is used until the deviations become small. Accordingly, fuel injection control is stabilized.

Preferably, the engine has a throttle valve (3) disposed in the intake pipe, an exhaust gas recirculation mechanism (5, 6) for recirculating exhaust gases to the intake pipe (2), and a turbo charger (8) having a compressor wheel (15) and a turbine wheel (10). The exhaust gas recirculation mechanism includes an exhaust gas recirculation passage (5) and an exhaust gas recirculation control valve (6) in the exhaust gas recirculation passage. The turbo charger (8) includes movable vanes (12) for changing a flow rate of exhaust gases injected to the turbine wheel (10). The intake gas state control means controls the intake gas state by changing openings (TH, LACT, VO) of the throttle valve, exhaust gas recirculation control valve, and movable vanes.

Preferably, the intake gas state control means controls the intake gas state using a model predictive control.

Preferably, a controlled object model used in the model predictive control is defined using, as control inputs, a mass flow rate (Gv) of gases passing through the movable vanes, a mass flow rate (Gr) of gases passing through the exhaust gas recirculation control valve, and a mass flow rate (Gth) of fresh air passing through the throttle valve.

BRIEF DESCRIPTION OF THE DRAWINGS

FIGS. 9A-9F are time charts used for illustrating an example of the control operation;

DETAILED DESCRIPTION OF PREFERRED EMBODIMENTS

Preferred embodiments of the present invention will now be described with reference to the drawings.

First Embodiment

Figure 1:
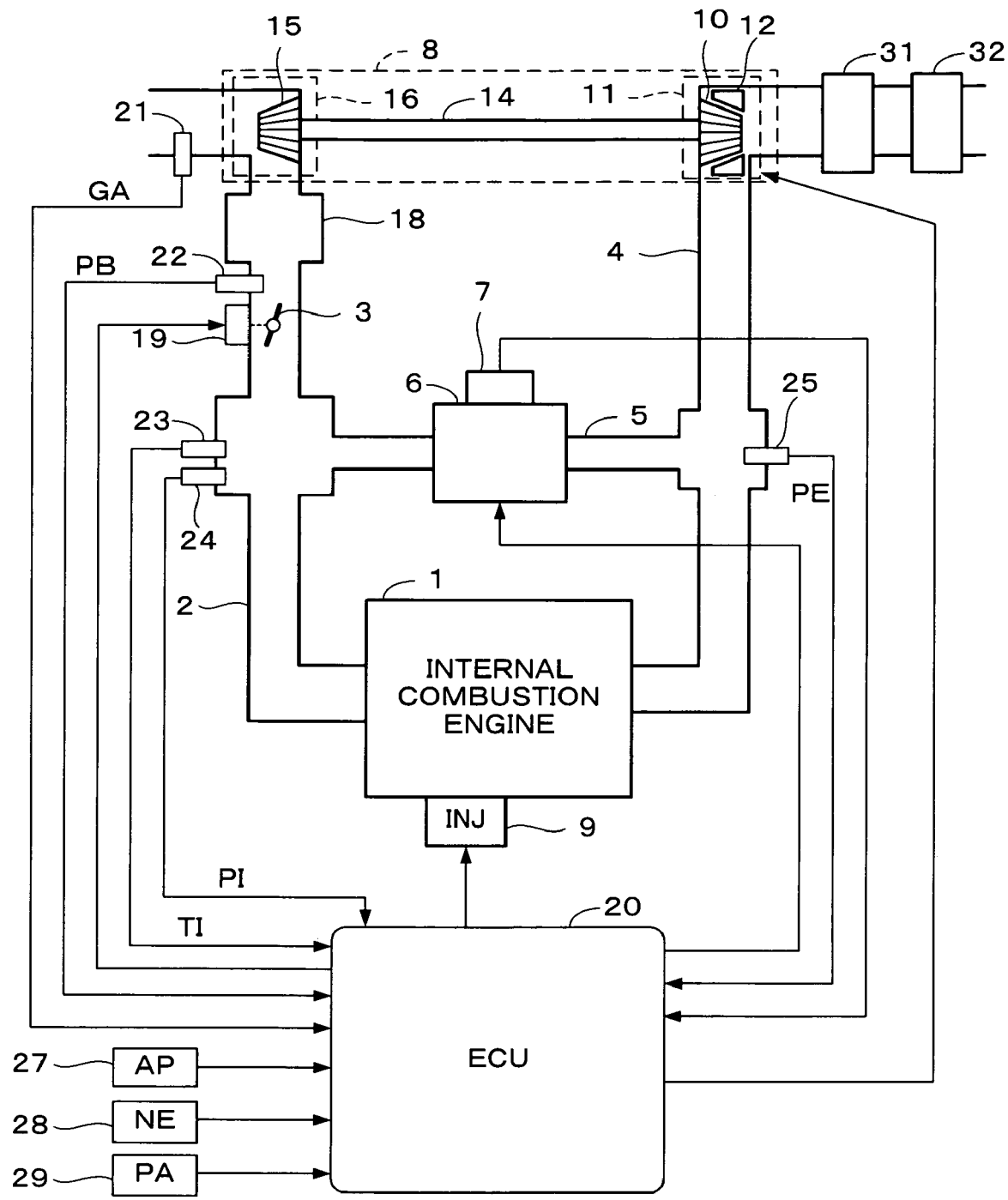
FIG. 1 is a schematic diagram of an internal combustion engine and a control system therefore according to a first embodiment of the present invention.

FIG. 1 is a schematic diagram showing a configuration of an internal combustion engine and a control system therefore according to a first embodiment of the present invention. The internal combustion engine 1 (hereinafter referred to as "engine") is a diesel engine wherein fuel is injected directly into the cylinders. Each cylinder is provided with a fuel injection valve 9 electrically connected to an electronic control unit 20 (hereinafter referred to as "ECU"). The ECU 20 controls a valve opening timing and a valve opening period of each fuel injection valve 9.

The engine 1 has an intake pipe 2, an exhaust pipe 4, and a turbocharger 8. The turbocharger 8 includes a turbine 11 and a compressor 16. The turbine 11 has a turbine wheel 10 rotatably driven by the kinetic energy of exhaust gases. The compressor 16 has a compressor wheel 15 connected to a turbine wheel 10 by a shaft 14. The compressor wheel 15 pressurizes (compresses) the intake air of the engine 1.

The turbine 11 has a plurality of movable vanes 12 (only two are illustrated) and an actuator (not shown) for actuating the movable vanes 12 to open and close. The plurality of movable vanes 12 are actuated to change a flow rate of the exhaust gases injected to the turbine wheel 10. The turbine 11 is configured so that the flow rate of the exhaust gases injected to the turbine wheel 10 is changed by adjusting an opening of the movable vane 12 (hereinafter referred to as "vane opening") VO, to change the rotational speed of the turbine wheel 10. The actuator, which actuates the movable vanes 12, is connected to the ECU 20, and the vane opening VO is controlled by the ECU 20. Specifically, the ECU 20 supplies a control signal of a variable duty ratio to the actuator, wherein the control signal controls the vane opening VO. The configuration of the turbocharger having movable vanes is known and, for example, disclosed in Japanese Patent Laid-open No. H01-208501.

The intake pipe 2 is provided with an intercooler 18 downstream of the compressor 16, and a throttle valve 3 downstream of the intercooler 18. The throttle valve 3 is configured to be actuated by an actuator 19 to open and close. The actuator 19 is connected to the ECU 20. The ECU 20 performs an opening control of the throttle valve 3 using the actuator 19. A throttle valve opening sensor (not shown) for detecting an opening TH of the throttle valve 3 is provided, and the detection signal of the throttle valve sensor is supplied to the ECU 20.

An exhaust gas recirculation passage 5 for recirculating exhaust gases to the intake pipe 2 is provided between the exhaust pipe 4 and the intake pipe 2. The exhaust gas recirculation passage 5 is provided with an exhaust gas recirculation control valve 6 (hereinafter referred to as "EGR valve") that controls the amount of exhaust gases that are recirculated. The EGR valve 6 is an electromagnetic valve having a solenoid. A valve opening of the EGR valve 6 is controlled by the ECU 20. The EGR valve 6 is provided with a lift sensor 7 for detecting a valve opening (a valve lift amount) LACT, and the detection signal is supplied to the ECU 20. The exhaust gas recirculation passage 5 and the EGR valve 6 form an exhaust gas recirculation mechanism.

An intake air flow rate sensor 21, a boost pressure sensor 22, an intake gas temperature sensor 23, and an intake pressure sensor 24 are disposed in the intake pipe 2. The intake air flow rate sensor 21 detects an intake air flow rate GA. The boost pressure sensor 22 detects an intake pressure PB (boost pressure) at a portion of the intake pipe 2 downstream of the compressor 16. The intake gas temperature sensor 23 detects an intake gas temperature TI. The intake pressure sensor 24 detects an intake pressure PI. Further, an exhaust pressure sensor 25 is disposed in the exhaust pipe 4. The exhaust pressure sensor 25 detects an exhaust pressure PE at a portion of the exhaust pipe 4 upstream of the turbine 11. The sensors 21 to 25 are connected to the ECU 20, and the detection signals from the sensors 21 to 25 are supplied to the ECU 20.

A catalytic converter 31 and a particulate filter 32 are disposed in the exhaust pipe 4 downstream of the turbine 11. The catalytic converter 31 accelerates oxidation of hydrocarbon and CO in the exhaust gases. The particulate filter 32 traps particulate matter which mainly consists of soot.

An accelerator sensor 27, an engine rotational speed sensor 28, and an atmospheric pressure sensor 29 are connected to the ECU 20. The accelerator sensor 27 detects an operation amount AP of the accelerator (not shown) of the vehicle driven by the engine 1 (hereinafter referred to as "the accelerator pedal operation amount AP"). The engine rotational speed sensor 28 detects an engine rotational speed NE. The atmospheric pressure sensor 29 detects an atmospheric pressure PA. The detection signals of the sensors 27 to 29 are supplied to the ECU 20.

The ECU 20 includes an input circuit, a central processing unit (hereinafter referred to as "CPU"), a memory circuit, and an output circuit. The input circuit performs various functions, including shaping the waveforms of input signals from the various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies control signals to the actuator for actuating the movable vanes 12 of the turbine 11, the fuel injection valves 9, the EGR valve 6, the actuator 19 for actuating the throttle valve 3, and the like.

The ECU 20 determines a combustion mode of the engine 1 according to the operating condition of the engine 1 and calculates a demand fresh air flow rate Giades, a demand intake pressure Pides, and a reference intake gas temperature Tinorm according to the operating condition of the engine 1. The ECU 20 also controls a state of gases (fresh air and recirculated gases) supplied to the engine 1 (the state of gases is hereinafter referred to as "intake gas state"). Specifically, the ECU 20 performs an intake gas state control wherein the vane opening VO, the throttle valve opening TH, and the lift amount (opening) LACT of the EGR valve 6 are controlled so that the detected flow rate GA and the detected intake pressure PI coincide with the demand fresh air flow rate Giades and the demand intake pressure Pides.

Further, the ECU 20 calculates a fuel injection amount command value Mfcmd and a fuel injection timing command value φfcmd for actuating the fuel injection valve 9 according to the engine operating condition and demand fresh air flow rate Giades, the demand intake pressure Pides, and the reference intake gas temperature Tinorm to perform a fuel injection control suitable for the engine operating condition and the intake gas state.

Figure 2:
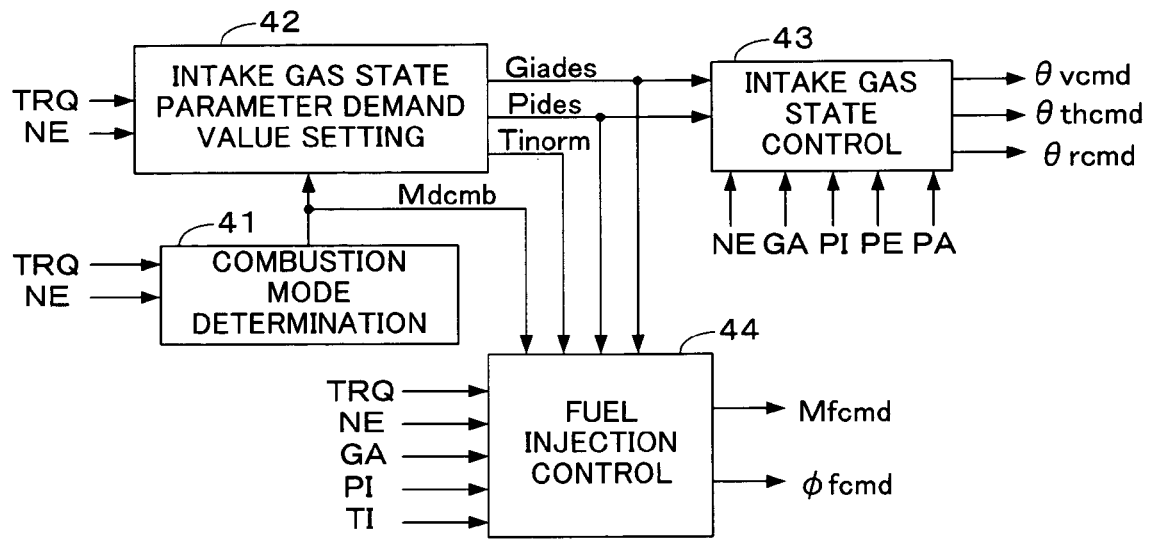
FIG. 2 is a block diagram showing a configuration of a control module for performing intake gas state control and fuel injection control of the internal combustion engine.

FIG. 2 is a block diagram showing a configuration of a control module which performs the above-described intake gas state control and fuel injection control. The function of each block shown in FIG. 2 is actually realized by operation processes executed by the CPU in the ECU 20. Maps for calculating various control parameters shown below are set using a well-known optimizing tool (i.e., computer program) based on previously obtained empirical results.

The control module shown in FIG. 2 includes a combustion mode determination block 41, an intake gas state parameter demand value setting block 42, an intake gas state control block 43, and a fuel injection control block 44. The functions of the functional blocks 41 to 43 are described below.

The combustion mode determination block 41 determines a combustion mode of the engine 1 according to the engine rotational speed NE and a demand torque TRQ. Specifically, the combustion mode determination block 41 selects one of a lean combustion mode, a rich combustion mode, and a premix combustion mode, and outputs a combustion mode parameter Mdcmb. In this embodiment, the combustion mode parameter Mdcmb is set to values of "1" to "3", wherein "1" corresponds to the lean combustion mode, "2" corresponds to the rich combustion mode, and "3" corresponds to the premix combustion mode.

The lean combustion mode is a combustion mode wherein the air-fuel ratio of the air-fuel mixture in the combustion chamber of the engine 1 is set to a value in a lean region with respect to the stoichiometric ratio. The rich combustion mode is a combustion mode wherein the air-fuel ratio is set to a value in the vicinity of the stoichiometric ratio or in a rich region with respect to the stoichiometric ratio, and the premix combustion mode is a combustion mode wherein the air-fuel ratio is set to a value in a range from the stoichiometric ratio to a value of about "20" by increasing the amount of recirculated exhaust gases relative to the lean combustion mode. In the premix combustion mode, an ignition delay time period (i.e., a time period extending from the fuel injection timing to the actual ignition timing) becomes longer, and the premix combustion is performed. The premix combustion mode is selected in the previously set premix combustion region, which is an engine operating region defined by the engine rotational speed NE and the demand torque TRQ.

The demand torque TRQ is calculated according to the engine rotational speed NE and the accelerator pedal operation amount AP. The demand torque TRQ is set to increase as the accelerator pedal operation amount AP increases.

The intake gas state parameter demand value setting block 42 sets the demand fresh air flow rate Giades, the demand intake pressure Pides, and the reference intake gas temperature Tinorm according to the engine rotational speed NE, the demand torque TRQ, and the combustion mode parameter Mdcmb. Basically, the demand fresh air flow rate Giades and the demand intake pressure Pides are set to increase as the engine rotational speed NE increases and/or the demand torque TRQ increases. The reference intake gas temperature Tinorm is empirically obtained by detecting the actual intake gas temperature in the state where the demand fresh air flow rate Giades and the demand intake pressure Pides are realized.

The intake gas state control block 43 calculates an opening command value θvcmd (hereinafter referred to as "vane opening command value") of the movable vanes 12, an opening command value θthcmd (hereinafter referred to as "throttle valve opening command value") of the throttle valve 3, and an opening command value θrcmd (hereinafter referred to as "EGR valve opening command value") of the EGR valve 6 according to the demand fresh air flow rate Giades, the demand intake pressure Pides, and the detected parameters of the engine rotational speed NE, the intake air flow rate GA, the intake pressure PI, the exhaust pressure PE, and the atmospheric pressure PA. That is, the intake gas state control block 43 performs a control wherein the detected intake air flow rate GA and the detected intake pressure PI converge, respectively, to the demand fresh air flow rate Giades and the demand intake pressure Pides by controlling the movable vane opening θvcmd, the throttle valve opening command value θthcmd, and the EGR valve opening command value θrcmd.

The fuel injection control block 44 calculates the fuel injection amount command value Mfcmd and the fuel injection timing command value φfcmd according to the combustion mode parameter Mdcmb, the demand fresh air flow rate Giades, the demand intake pressure Pides, the reference intake gas temperature Tinorm, and the detected parameters of the engine rotational speed NE, the intake air flow rate GA, the intake pressure PI, and the intake gas temperature TI. The fuel injection valve 9 is actuated by the drive signal according to the fuel injection amount command value Mfcmd and the fuel injection timing command value φfcmd.

Figure 3:
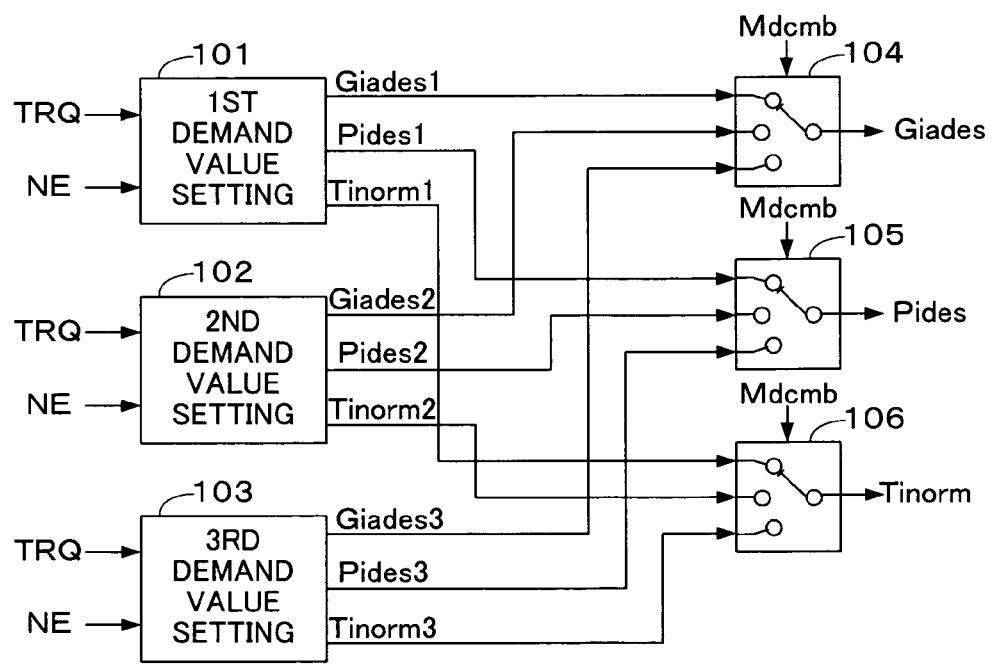
FIG. 3 is a block diagram showing a configuration of an intake gas state parameter demand value setting block shown in FIG. 2.

FIG. 3 is a block diagram showing a configuration of the intake gas state parameter demand value setting block 42. The intake gas state parameter demand value setting block 42 includes a first demand value setting block 101, a second demand value setting block 102, a third demand value setting block 103, and switching blocks 104-106. The first demand value setting block 101 retrieves a Giades1 map, a Pides1 map, and a Tinorm1 map (none of which are shown) suitable for the lean combustion mode according to the engine rotational speed NE and the demand torque TRQ to calculate a first demand fresh air flow rate Giades1, a first demand intake pressure Pides1, and a first reference intake gas temperature Tinorm1. The second demand value setting block 102 retrieves a Giades2 map, a Pides2 map, and a Tinorm2 map (none of which are shown) suitable for the rich combustion mode according to the engine rotational speed NE and the demand torque TRQ to calculate a second demand fresh air flow rate Giades2, a second demand intake pressure Pides2, and a second reference intake gas temperature Tinorm2. The third demand value setting block 103 retrieves a Giades3 map, a Pides3 map, and a Tinorm3 map (none of which are shown) suitable for the premix combustion mode according to the engine rotational speed NE and the demand torque TRQ to calculate a third demand fresh air flow rate Giades3, a third demand intake pressure Pides3, and a third reference intake gas temperature Tinorm3.

The switching block 104 selects any one of the first-to-third demand fresh air flow rates Giades1, Giades2, and Giades3 according to the combustion mode parameter Mdcmb and outputs the selected parameter as the demand fresh air flow rate Giades. If Mdcmb is equal to "1", the first demand fresh air flow rate Giades1 is selected. If Mdcmb is equal to "2", the second demand fresh air flow rate Giades2 is selected. If Mdcmb is equal to "3", the third demand fresh air flow rate Giades3 is selected. Similar switching is also performed in the switching blocks 105 and 106. If Mdcmb is equal to "1", the first demand intake pressure Pides1 and the first reference intake gas temperature Tinorm1 are selected. If Mdcmb is equal to "2", the second demand intake pressure Pides2 and the second reference intake gas temperature Tinorm2 are selected. If Mdcmb is equal to "3", the third demand intake pressure Pides3 and the third reference intake gas temperature Tinorm3 are selected.

Figure 4:
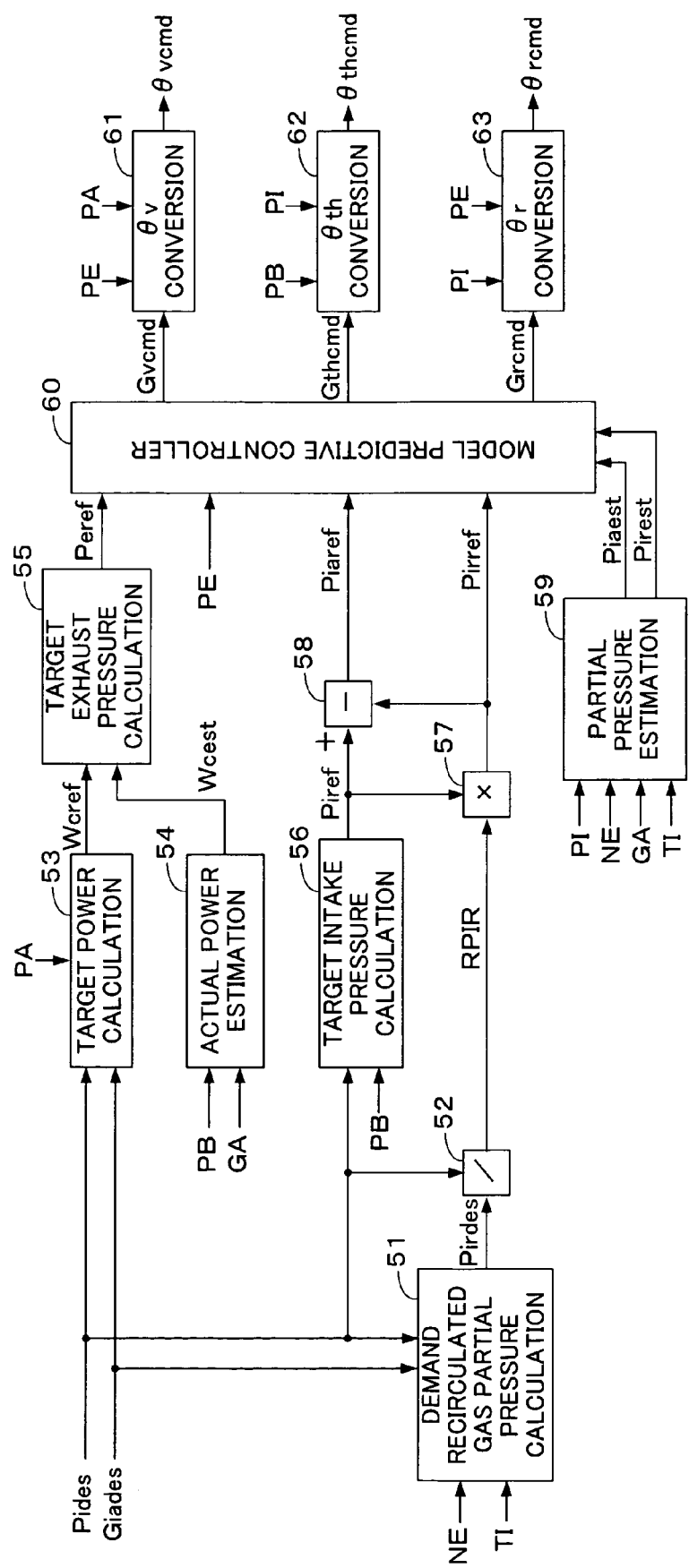
FIG. 4 is a block diagram showing a configuration of an intake gas state control block shown in FIG. 2.

FIG. 4 is a block diagram showing a configuration of the intake gas state control block 43. The intake gas state control block 43 includes a demand recirculated gas partial pressure calculation block 51, a target power calculation block 53, an actual power estimation block 54, a target exhaust pressure calculation block 55, a dividing block 52, a target intake pressure calculation block 56, a multiplying block 57, a subtracting block 58, a partial pressure estimation block 59, a model predictive controller 60, a θv conversion block 61, a θth conversion block 62, and a θr conversion block 63.

Figure 5:
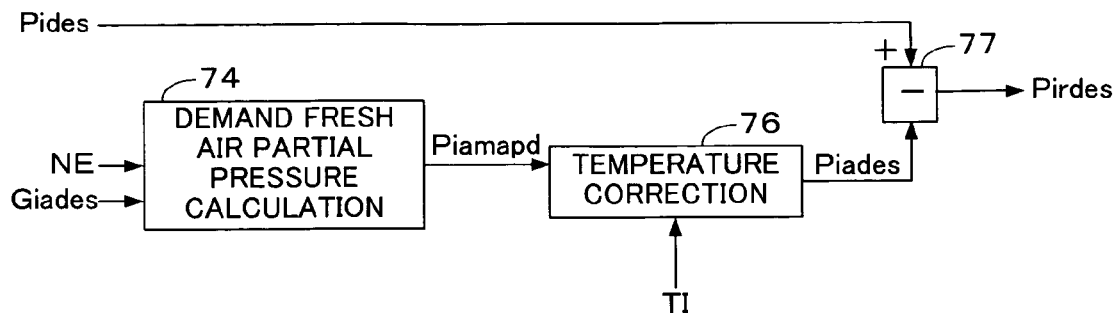
FIG. 5 is a block diagram showing a configuration of a demand recirculated gas pressure calculation block shown in FIG. 4.

The demand recirculated gas partial pressure calculation block 51 includes, as shown in FIG. 5, a demand fresh air partial pressure calculation block 74, a temperature correction block 76, and a subtracting block 77. The demand fresh air partial pressure calculation block 74 retrieves a Pia map according to the engine rotational speed NE and the demand fresh air flow rate Giades to calculate a demand fresh air partial pressure map value Piamapd. A demand fresh air partial pressure is a desired value of the fresh air partial pressure in the intake gases of the engine 1. The Pia map is set according to a condition wherein the intake gas temperature TI is equal to a predetermined temperature TINOR.

A mass Mia of fresh air occupying a volume of one cylinder and a demand fresh air partial pressure map value Piamapd have a relationship expressed by equation (1)

$$Piamapd = \{R \times TINOR/(\eta v \times Vs)\}Mia \quad (1)$$

where "R" is the gas constant, ηv is a volumetric efficiency, and Vs is a volume of the cylinder.

From equation (1), the demand fresh air partial pressure Piades corresponding to the intake gas temperature TI is given by equation (2).

$$Piades = (TI/TINOR)Piamapd \quad (2)$$

The temperature correction block 76 applies the detected intake gas temperature TI to equation (2) to correct the map value Piamapd, thereby calculating the demand fresh air partial pressure Piades. The subtracting block 77 subtracts the demand fresh air partial pressure Piades from the demand intake pressure Pides to calculate a demand recirculated gas partial pressure Pirdes.

Referring again to FIG. 4, the target power calculation block 53 retrieves a Wcref map according to the demand intake pressure Pides, the demand fresh air flow rate Giades, and the atmospheric pressure PA to calculate a target power Wcref of the compressor 16. The Wcref map is set so that the target power Wcref increases as the demand intake pressure Pides or the demand fresh air flow rate Giades increases, or the atmospheric pressure PA decreases. The target power Wcref may alternatively be calculated by equation (3a). The actual power estimation block 54 applies the detected boost pressure PB and the detected intake air flow rate GA to equation (3b) to calculate an actual power estimated value Wcest of the compressor 16

$$Wcref = \frac{1}{\eta cmp} Giades \cdot cp \cdot TA \left\{ \left( \frac{Pides}{PA} \right)^{\frac{\kappa a-1}{\kappa a}} - 1 \right\} \quad (3a)$$

$$Wcest = \frac{1}{\eta cmp} GA \cdot cp \cdot TA \left\{ \left( \frac{PB}{PA} \right)^{\frac{\kappa a-1}{\kappa a}} - 1 \right\} \quad (3b)$$

where ηcmp is an efficiency of the compressor, cp is an isopiestic specific heat of air, TA is an atmospheric temperature, and κa is a specific heat ratio of air.

The target exhaust pressure calculation block 55 calculates the target exhaust pressure Peref so that the actual power estimated value Wcest coincides with the target power Wcref. Specifically, when the actual power estimated value Wcest is smaller than the target power Wcref, the target exhaust pressure calculation block 55 updates the target exhaust pressure Peref in the increasing direction, and when the actual power estimated value Wcest is greater than the target power Wcref, the target exhaust pressure calculation block 55 updates the target exhaust pressure Peref in the decreasing direction.

The target intake pressure calculation block 56 compares the detected boost pressure PB with the demand intake pressure Pides and selects the lower pressure to calculate the target intake pressure Piref. The dividing block 52 divides the demand recirculated gas partial pressure Pirdes by the demand intake pressure Pides to calculate a demand recirculated gas ratio RPIR. The multiplying block 57 multiplies the target intake pressure Piref and the demand recirculated gas ratio RPIR to calculate a target recirculated gas partial pressure Pirref. The subtracting block 58 subtracts the target recirculated gas partial pressure Pirref from the target intake pressure Piref to calculate a target fresh air partial pressure Piaref.

Figure 6:
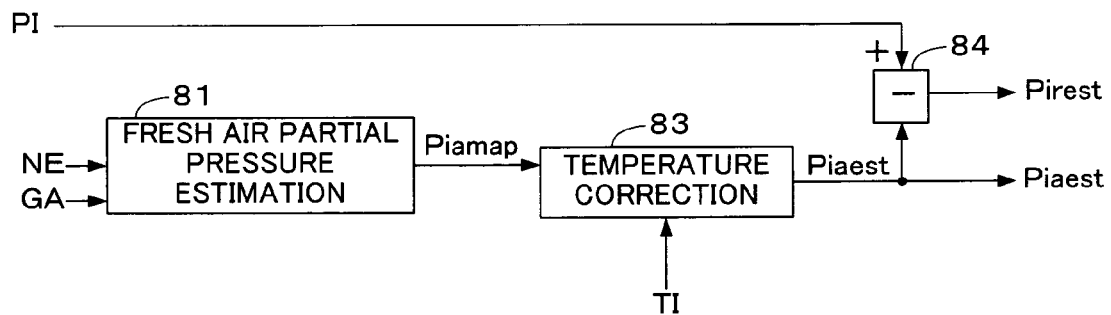
FIG. 6 is a block diagram showing a configuration of a partial pressure estimation block shown in FIG. 4.

As shown in FIG. 6, the partial pressure estimation block 59 includes a fresh air partial pressure estimation block 81, a temperature correction block 83, and a subtracting block 84. The fresh air partial pressure estimation block 81 calculates a fresh air partial pressure estimation map value Piamap according to the detected engine rotational speed NE and the detected intake air flow rate GA. The fresh air partial pressure estimation map value Piamap is calculated to increase as the intake air flow rate GA increases, or the engine rotational speed NE decreases. Specifically, the fresh air partial pressure estimation map value Piamap is set to be proportional to the intake air flow rate GA and inversely proportional to the engine rotational speed NE. The temperature correction block 83 corrects the fresh air partial pressure estimation map value Piamap according to the detected intake gas temperature TI to calculate an estimated fresh air partial pressure Piaest like the temperature correction block 76 shown in FIG. 5. The subtracting block 84 subtracts the estimated fresh air partial pressure Piaest from the detected intake pressure PI to calculate an estimated recirculated gas partial pressure Pirest.

Referring again to FIG. 4, the model predictive controller 60 calculates a turbine gas flow rate command value Gvcmd, a fresh air flow rate command value Gthcmd, and a recirculated gas flow rate command value Grcmd using the model predictive control so that the detected exhaust pressure PE, the estimated fresh air partial pressure Piaest, and the estimated recirculated gas partial pressure Pirest coincide, respectively, with the target exhaust pressure Peref, the target fresh air partial pressure Piaref, and the target recirculated gas partial pressure Pirref. The turbine gas flow rate command value Gvcmd is a command value of a flow rate of the gases passing through the turbine 11. The fresh air flow rate command value Gthcmd is a command value of a flow rate of fresh air passing through the throttle valve 3, and the recirculated gas flow rate command value Grcmd is a command value of a flow rate of recirculated gases passing through the EGR valve 6.

The θv conversion block 61 converts the turbine gas flow rate command value Gvcmd to an opening command value θv of the movable vane 12 (hereinafter referred to as "vane opening command value") according to the detected exhaust pressure PE and the detected atmospheric pressure PA. Specifically, the θv conversion block 61 performs the conversion as described below.

The relationship of equation (4) is satisfied by modeling the turbine 11 as a nozzle.

$$Gvcmd = Atb(\theta vcmd) \times U(PE) \times \Phi(PA/PE) \quad (4)$$

In equation (4), Atb(θvcmd) is an effective opening area of the movable vanes which is a function of the vane opening, U(PE) is an upstream condition function calculated by equation (5), and Φ(PA/PE) is a function of a ratio of the downstream side pressure and the upstream side pressure of the movable vane 12. In equation (5), ρe is a density of the exhaust gases passing through the turbine 11, and in equations (6) and (7), κe is a specific heat ratio of the exhaust gases passing through the turbine 11. When the velocity of the flowing exhaust gases is lower than the acoustic velocity, equation (6) is applied. Equation (7) is applied when the velocity of the flowing exhaust gases is equal to or higher than the acoustic velocity.

$$U(PE) = \sqrt{2PE \cdot \rho e} \quad (5)$$

$$\Phi = \sqrt{\frac{\kappa e}{\kappa e - 1} \left\{ \left( \frac{PA}{PE} \right)^{\frac{2}{\kappa e}} - \left( \frac{PA}{PE} \right)^{\frac{\kappa e + 1}{\kappa e}} \right\}} \quad \left( \frac{PA}{PE} \right) > \left( \frac{2}{\kappa e + 1} \right)^{\frac{\kappa e}{\kappa e - 1}} \quad (6)$$

$$\Phi = \left( \frac{2}{\kappa e + 1} \right)^{\frac{\kappa e}{\kappa e - 1}} \sqrt{\frac{\kappa e}{\kappa e + 1}} \quad \left( \frac{PA}{PE} \right) \leq \left( \frac{2}{\kappa e + 1} \right)^{\frac{\kappa e}{\kappa e - 1}} \quad (7)$$

The effective opening area Atb(θvcmd) is calculated by equation (8) obtained from equation (4), and the vane opening command value θvcmd is calculated by retrieving a conversion table previously set according to the effective opening area Atb(θvcmd).

$$Atb(\theta vcmd) = Gvcmd / \{U(PE) \times \Phi(PA/PE)\} \quad (8)$$

The θth conversion block 62 and the θr conversion block 63, respectively, calculate an effective opening area Ath(θth) of the throttle valve 3 and an effective opening area Ar(θr) of the EGR valve 6 by equations (9) and (10), and respectively retrieve conversion tables according to the effective opening areas $Ath(\theta th)$ and $Ar(\theta r)$ to calculate the throttle valve opening command value $\theta thcmd$ and the EGR valve opening command value $\theta rcmd$.

$$Ath(\theta thcmd) = Gthcmd / \{U(PB) \times \Phi(PI/PB)\} \quad (9)$$

$$Ar(\theta rcmd) = Grcmd / \{U(PE) \times \Phi(PI/PE)\} \quad (10)$$

$U(PB)$ and $\Phi(PI/PB)$ in equation (9), and $\Phi(PI/PE)$ in equation (10) are given by equations (11) to (15)

$$U(PB) = \sqrt{2PB \cdot \rho a} \quad (11)$$

$$\Phi = \sqrt{\frac{\kappa a}{\kappa a - 1}\left\{\left(\frac{PI}{PB}\right)^{\frac{2}{\kappa a}} - \left(\frac{PI}{PB}\right)^{\frac{\kappa a+1}{\kappa a}}\right\}} \quad \left(\frac{PI}{PB}\right) > \left(\frac{2}{\kappa a+1}\right)^{\frac{\kappa a}{\kappa a-1}} \quad (12)$$

$$\Phi = \left(\frac{2}{\kappa a + 1}\right)^{\frac{\kappa a}{\kappa a - 1}} \sqrt{\frac{\kappa a}{\kappa a + 1}} \quad \left(\frac{PI}{PB}\right) \leq \left(\frac{2}{\kappa a+1}\right)^{\frac{\kappa a}{\kappa a-1}} \quad (13)$$

$$\Phi = \sqrt{\frac{\kappa e}{\kappa e - 1}\left\{\left(\frac{PI}{PE}\right)^{\frac{2}{\kappa e}} - \left(\frac{PI}{PE}\right)^{\frac{\kappa e+1}{\kappa e}}\right\}} \quad \left(\frac{PI}{PE}\right) > \left(\frac{2}{\kappa e+1}\right)^{\frac{\kappa e}{\kappa e-1}} \quad (14)$$

$$\Phi = \left(\frac{2}{\kappa e + 1}\right)^{\frac{\kappa e}{\kappa e - 1}} \sqrt{\frac{\kappa e}{\kappa e + 1}} \quad \left(\frac{PI}{PE}\right) \leq \left(\frac{2}{\kappa e+1}\right)^{\frac{\kappa e}{\kappa e-1}} \quad (15)$$

where $\rho a$ in equation (11) is a density of air, and $\kappa a$ in equation (12) and (13) is the specific heat ratio of air.

The opening of the movable vane 12, the opening of the throttle valve 3, and the opening of the EGR valve 6 are controlled based on the vane opening command value $\theta vcmd$, the throttle valve opening command value $\theta thcmd$, and the EGR valve opening command value $\theta rcmd$, respectively, output from the $\theta v$ conversion block 61, the $\theta th$ conversion block 62, and the $\theta r$ conversion block 63.

Next, the model predictive controller 60 will be explained. First, a controlled object model obtained by modeling the controlled object of the controller 60 is explained.

The relationship between a mass M and a pressure P of gases in a chamber of a volume V is expressed by equation (20) using an absolute temperature T.

$$PV = MRT \quad (20)$$

Equation (21) is obtained by differentiating equation (20) with respect to time $$\frac{dP}{dt} = \kappa n \frac{RT}{V} \frac{dM}{dt} \quad (21)$$

where $\kappa n$ is a polytropic index which takes a value greater than "1.0" and equal to or less than the specific heat ratio $\kappa$ of the gas in the chamber.

The relationship of equation (21) is applied to the fresh air partial pressure $Pia$ in the intake pipe 2 to obtain equation (22).

$$\frac{d}{dt}Pia = ki\left(G'th - \frac{Pia}{Pi}G'z\right) \quad (22)$$

where $G'th$ is a fresh air flow rate per unit time period passing through the throttle valve 3, $G'z$ is an intake gas flow rate per unit time period flowing into the cylinder and $Pi$ is an intake pressure. Further, the constant $ki$ is given by equation (23)

$$ki = \kappa ni \frac{RTi}{Vi} \quad (23)$$

where $Ti$ is an intake gas temperature, $Vi$ is a volume of a portion downstream of the throttle valve 3 in the intake pipe, and $\kappa ni$ is a polytropic index.

Since the intake gas flow rate $G'z$ in equation (22) is expressed by equation (24), equation (22) is expressed by equation (25)

$$G'z = \frac{NE}{2} \cdot Pcyl \frac{Vcyl}{RTcyl} \cong \eta v \cdot \frac{NE}{2} \cdot Pi \frac{Vcyl}{RTi} = k'_{\eta v} Pi \quad (24)$$

$$\left(k'_{\eta v} = \frac{NE\eta v}{2} \cdot \frac{Vcyl}{RTi}\right)$$

$$\frac{d}{dt}Pia = -k'_{\eta v} ki \cdot Pia + ki \cdot G'th \quad (25)$$

where NE is an engine rotational speed, $Pcyl$ is a pressure in the cylinder, $Vcyl$ is a cylinder volume, $Tcyl$ is a temperature in the cylinder, and $\eta v$ is a volumetric efficiency.

In equation (25), the coefficient of the fresh air partial pressure $Pia$ is dependent on the engine rotational speed NE. Therefore, equation (25) is converted to an equation based on the crank angle $\alpha$ (specifically, "$dt/d\alpha = 1/NE$" is multiplied with both sides of equation (25)) to obtain equation (26). $Gth$ in equation (26) is a flow rate of fresh air passing through the throttle valve 3 per unit crank angle period.

Regarding the recirculated gas partial pressure $Pir$ in the intake pipe, equation (27) is similarly obtained. In equation (27), $Gr$ is a flow rate of recirculated gases passing through the EGR valve 6 per unit crank angle period.

$$\frac{d}{d\alpha}Pia = -k_{\eta v} ki \cdot Pia + ki \cdot Gth \quad (26)$$

$$\left(k_{\eta v} = \frac{\eta v}{2} \cdot \frac{Vcyl}{RTi}\right)$$

$$\frac{d}{d\alpha}Pir = -k_{\eta v} ki \cdot Pir + ki \cdot Gr \quad (27)$$

On the other hand, equation (28) is satisfied with respect to the exhaust gases on the upstream side of the turbine in the exhaust pipe 4

$$\frac{d}{dt}Pe = ke(G'z - G'r - G'v) \quad (28)$$

$$\left(ke = \kappa ne \frac{RTe}{Ve}\right)$$

where $Pe$ is an exhaust pressure on the upstream side of the turbine in the exhaust pipe 4, $G'r$ is a flow rate of recirculated gases per unit time, $G'v$ is a flow rate of exhaust gases passing through the turbine 11 per unit time, Te is a temperature of exhaust gases, Ve is a volume of a portion upstream of the turbine in the exhaust pipe, and κne is a polytropic index.

The intake gas flow rate G'z is expressed by equation (29) by transforming equation (24).

$$G'z = k'_{\eta v} \times Pi = k'_{\eta v}(Pia + Pir) \quad (29)$$

The relationship expressed by equation (29) is applied to equation (28) to obtain equation (30), wherein equation (30) is further transformed to an equation based on the crank angle to obtain equation (31).

$$\frac{d}{dt}Pe = k'_{\eta v}ke(Pia + Pir) - ke(G'r + G'v) \quad (30)$$

$$\frac{d}{d\alpha}Pe = k_{\eta v}ke(Pia + Pir) - ke(Gr + Gv) \quad (31)$$

Equation (32) is obtained by combining equations (26), (27), and (31).

$$\frac{d}{d\alpha}\begin{bmatrix} Pia \\ Pir \\ Pe \end{bmatrix} = \begin{bmatrix} -k_{\eta v}ki & 0 & 0 \\ 0 & -k_{\eta v}ki & 0 \\ k_{\eta v}ke & k_{\eta v}ke & 0 \end{bmatrix}\begin{bmatrix} Pia \\ Pir \\ Pe \end{bmatrix} + \begin{bmatrix} ki & 0 & 0 \\ 0 & ki & 0 \\ 0 & -ke & -ke \end{bmatrix}\begin{bmatrix} u_{th} \\ u_r \\ u_v \end{bmatrix} \quad (32)$$

$$\begin{bmatrix} u_{th} \\ u_r \\ u_v \end{bmatrix} = [\, Gth \quad Gr \quad Gv \,]^T$$

Next, the controlled object model defined by equation (32) is converted to a controlled object model of a discrete time system using time k obtained by digitizing analog time t with a sampling period h. The digitized controlled object model is defined by equation (34). The control output x(k), the control input u(k), and the model parameter matrix A and B in equation (34) are expressed by equations (35)-(38).

$$x(k+1) = Ax(k) + Bu(k) \quad (34)$$

$$x(k) = \begin{bmatrix} Pia(k) \\ Pir(k) \\ Pe(k) \end{bmatrix} \quad (35)$$

$$u(k) = \begin{bmatrix} Gth(k) \\ Gr(k) \\ Gv(k) \end{bmatrix} \quad (36)$$

$$A = \begin{bmatrix} 1 - hk_{\eta v}ki & 0 & 0 \\ 0 & 1 - hk_{\eta v}ki & 0 \\ hk_{\eta v}ke & hk_{\eta v}ke & 1 \end{bmatrix} \quad (37)$$

$$B = \begin{bmatrix} hki & 0 & 0 \\ 0 & hki & 0 \\ 0 & -hke & -hke \end{bmatrix} \quad (38)$$

Figure 7:
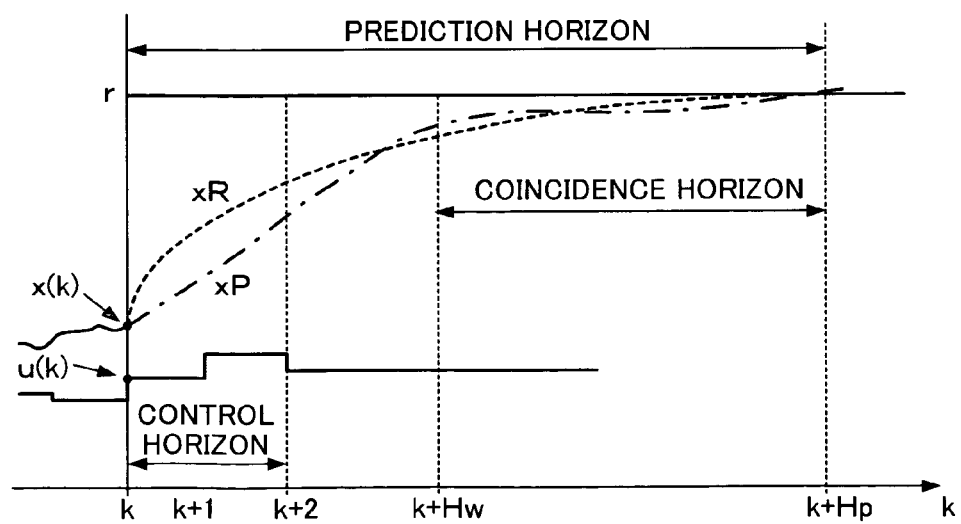
FIG. 7 is a graph of the control output and target value used for explaining an outline of model predictive control.

FIG. 7 is a graph used for explaining an outline of the model predictive control. In FIG. 7, the control wherein control output x(k) is made to coincide with a target value (target vector) r is shown. The control operation is performed using the following method.

1) The output x(k) is measured at the present time k, and the reference trajectory xR (indicated by the broken line), which is gradually approaching the target value r, is calculated.

2) The predicted value xP(k+i) of the future output is calculated using the predicting equation, and control inputs u(k), u(k+1), . . . , u(k+Hu−1) are calculated using the optimizing operation algorithm in the control horizon that is a period of Hu steps (Hu=2 in FIG. 7) after the present time k so that the predicted value xP approaches the reference trajectory xR as nearly as possible in the coincidence horizon.

3) The only one control input u(k) of the calculated control inputs u(k), u(k+1), . . . , u(k+Hu−1) is actually input to the controlled object.

4) The above steps 1) to 3) are repeated at time (k+1) and thereafter.

Next, the details of the model predictive control are described below. For example, the output x(k+2) is given by equation (39) which is obtained by repeatedly using equation (34). In general, the output x(k+i), which is an output after a discrete time period i has elapsed, is given by equation (40).

$$x(k+2) = A^2 x(k) + ABu(k) + Bu(k+1) \quad (39)$$

$$x(k+i) = A^i x(k) + A^{i-1} Bu(k) + \ldots + Bu(k+i-1) \quad (40)$$

The predicted value x(k+i) of the control output x is calculated based on the assumption that the control input u changes in the control horizon from time k to time (k+Hu−1) and thereafter takes a constant value. The present control input u(k) is determined so that the predicted value x(k+i) coincides with the target value in the coincidence horizon, that is, wherein the value of an evaluation function V, which indicates a deviation from the target value, becomes minimum.

In order to determine the control input u(k), the following method is employed. First, equation (40) is transformed to an equation defined by using a control input change amount Δu(k), and the optimal control input change amount Δu(k)opt is calculated. Second, the optimal control input change amount Δu(k)opt is accumulated to calculate the control input u(k).

The relationship between the control input change amount Δu(k) and the control input u(k) is expressed by equation (41).

$$u(k) = \Delta u(k) + u(k-1) \quad (41)$$

Equations (42) and (43) are obtained by transforming equation (40) using the relationship of equation (41). Equation (42) is applied in the period wherein the discrete time i is "1" to "Hu", and equation (43) is applied in the period wherein the discrete time i is "(Hu+1)" to "Hp". In equations (42) and (43), "I" is a unit matrix. Equation (44) is obtained by combining equations (42) and (43) in order to be expressed in the form of a matrix and vectors.

$$x(k+i) = A^i x(k) + (A^{i-1} + \ldots + A + I)B\Delta u(k) + \ldots + \\ B\Delta u(k+i-1) + (A^{i-1} + \ldots + A + I)Bu(k-1) \quad (42)$$
$$(i = 1 \sim Hu)$$

$$x(k+i) = A^i x(k) + (A^{i-1} + \ldots + A + I)B\Delta u(k) + \ldots + \\ (A^{i-Hu} + \ldots + A + I)B\Delta u(k+Hu-1) + \\ (A^{i-1} + \ldots + A + I)Bu(k-1) \quad (43)$$
$$(i = Hu+1 \sim Hp)$$

-continued $$\begin{bmatrix} x(k+1) \\ \vdots \\ x(k+Hu) \\ x(k+Hu+1) \\ \vdots \\ x(k+Hp) \end{bmatrix} = \begin{bmatrix} A \\ \vdots \\ A^{Hu} \\ A^{Hu+1} \\ \vdots \\ A^{Hp} \end{bmatrix} x(k) + \begin{bmatrix} B \\ \vdots \\ \sum_{i=0}^{Hu-1} A^i B \\ \sum_{i=0}^{Hu} A^i B \\ \vdots \\ \sum_{i=0}^{Hp-1} A^i B \end{bmatrix} u(k-1) + \quad (44)$$

$$\begin{bmatrix} B & \cdots & 0 \\ AB+B & \cdots & 0 \\ \vdots & \ddots & \vdots \\ \sum_{i=0}^{Hu-1} A^i B & \cdots & B \\ \sum_{i=0}^{Hu} A^i B & \cdots & AB+B \\ \vdots & \vdots & \vdots \\ \sum_{i=0}^{Hp-1} A^i B & \cdots & \sum_{i=0}^{Hp-Hu} A^i B \end{bmatrix} \begin{bmatrix} \Delta u(k) \\ \vdots \\ \Delta u(k+Hu-1) \end{bmatrix}$$

Next, if the evaluation function V is defined by equation (45), equation (45) can be written as equation (49) by defining vectors X(k), T(k), and ΔU(k) with equations (46)-(48). In equation (45), Q(i) and R(i) are weighting coefficients, and the weighting matrixes Q and R in equation (49) are provided by equations (50) and (51).

$$V(k) = \sum_{i=Hw}^{Hp} \|x(k+i) - r(k+i)\|_{Q(i)}^2 + \sum_{i=0}^{Hu-1} \|\Delta u(k+i)\|_{R(i)}^2 \quad (45)$$

$$X(k) = \begin{bmatrix} x(k+Hw) \\ \vdots \\ x(k+Hp) \end{bmatrix} \quad (46)$$

$$T(k) = \begin{bmatrix} r(k+Hw) \\ \vdots \\ r(k+Hp) \end{bmatrix} \quad (47)$$

$$\Delta U(k) = \begin{bmatrix} \Delta u(k) \\ \vdots \\ \Delta u(k+Hu-1) \end{bmatrix} \quad (48)$$

$$V(k) = \|X(k) - T(k)\|_Q^2 + \|\Delta U(k)\|_R^2 \quad (49)$$

$$Q = \begin{bmatrix} Q(Hw) & 0 & \cdots & 0 \\ 0 & Q(Hw+1) & \cdots & \vdots \\ \vdots & \vdots & \ddots & \vdots \\ 0 & 0 & \cdots & Q(Hp) \end{bmatrix} \quad (50)$$

$$R = \begin{bmatrix} R(0) & 0 & \cdots & 0 \\ 0 & R(1) & \cdots & \vdots \\ \vdots & \vdots & \ddots & \vdots \\ 0 & 0 & \cdots & R(Hu-1) \end{bmatrix} \quad (51)$$

Further, if the coefficient matrixes in equation (44) are expressed by ψ, Γ, and Θ as equations (52)-(54), the predicted value vector X(k) in the coincidence horizon ((k+Hw)–(k+Hp)) is expressed by equation (55).

$$\Psi = \begin{bmatrix} A^{Hw} \\ \vdots \\ A^{Hp} \end{bmatrix} \quad (52)$$

$$\Gamma = \begin{bmatrix} \sum_{i=0}^{Hw-1} A^i B \\ \vdots \\ \sum_{i=0}^{Hp-1} A^i B \end{bmatrix} \quad (53)$$

$$\Theta = \begin{bmatrix} \sum_{i=0}^{Hw-1} A^i B & \cdots & \sum_{i=0}^{Hw-Hu} A^i B \\ \vdots & \ddots & \vdots \\ \sum_{i=0}^{Hp-1} A^i B & \cdots & \sum_{i=0}^{Hp-Hu} A^i B \end{bmatrix} \quad (54)$$

$$X(k) = \Psi x(k) + \Gamma u(k-1) + \Theta \Delta u(k) \quad (55)$$

If a tracking error ε(k) is defined by equation (56), the evaluation function V of equation (49) is transformed to equation (57).

$$\varepsilon(k) = T(k) - \Psi x(k) - \Gamma u(k-1) \quad (56)$$

$$V(k) = \|\Theta \Delta U(k) - \varepsilon(k)\|_Q^2 + \|\Delta U(k)\|_R^2 \quad (57)$$

Further, if matrixes SQ and SR, which correspond respectively to square roots of the weighting matrixes Q and R, are defined by equations (58) and (59), a squared length of the vector expressed by equation (60) corresponds to the evaluation function V.

$$SQ = \begin{bmatrix} \sqrt{Q(Hw)} & 0 & \cdots & 0 \\ 0 & \sqrt{Q(Hw+1)} & \cdots & \vdots \\ \vdots & \vdots & \ddots & \vdots \\ 0 & 0 & \cdots & \sqrt{Q(Hp)} \end{bmatrix} \quad (58)$$

$$SR = \begin{bmatrix} \sqrt{R(0)} & 0 & \cdots & 0 \\ 0 & \sqrt{R(1)} & \cdots & \vdots \\ \vdots & \vdots & \ddots & \vdots \\ 0 & 0 & \cdots & \sqrt{R(Hu-1)} \end{bmatrix} \quad (59)$$

$$\begin{bmatrix} SQ\{\Theta \Delta U(k) - \varepsilon(k)\} \\ SR \Delta U(k) \end{bmatrix} \quad (60)$$

Therefore, the optimal control input change amount vector ΔU(k)opt is calculated as a control input change amount vector ΔU(k) that makes the length of the vector expressed by equation (60) minimum. This calculation can be performed with the QR algorism (e.g., refer to "Predictive Control with Constraints" by Jan M. Maciejowski, Japanese version published on Jan. 20, 2005 by Tokyo Denki University Press (hereinafter referred to as "document 1").

If using the expression shown in document 1, the optimal control input change amount vector Δu(k)opt is expressed by equations (61), (62), and (63). The back slash included in equation (63) indicates the operation for calculating the least-square solution. In equation (62), $I_m$ is a unit matrix having m-rows and m-columns, and $0_m$ is a matrix having m-rows and m-columns whose elements are all "0". The matrix $[I_m\ O_m\ O_m \cdots O_m]$ is a matrix for extracting only the vector $\Delta u(k)opt$ that is actually used in the calculation of the control input u(k) from the vector $\Delta U(k)$.

$$\Delta u(k)opt = KMPC \cdot \varepsilon(k) \tag{61}$$

$$KMPC = [I_m O_m O_m \ldots O_m]KFULL \tag{62}$$

$$KFULL = \begin{bmatrix} SQ\Theta \\ SR \end{bmatrix} \backslash \begin{bmatrix} SQ \\ 0 \end{bmatrix} \tag{63}$$

Figure 8:
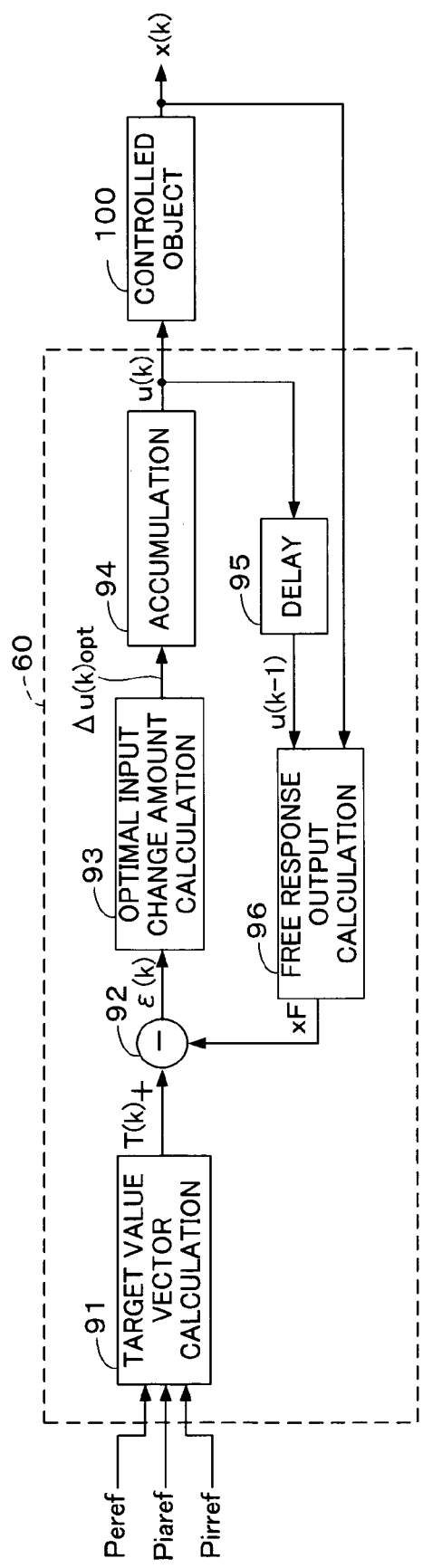
FIG. 8 is a block diagram showing a configuration of a model predictive controller shown in FIG. 4.

FIG. 8 is a block diagram showing a configuration of the model predictive controller 60. The model predictive controller 60 includes a target value vector calculation block 91, a subtracting block 92, an optimal input change amount calculation block 93, an accumulation block 94, a delay block 95, and a free response output calculation block 96. FIG. 8 shows a configuration in which the control input u(k) is input to the controlled object 100, and the control output x(k) is fed back to the model predictive controller 60.

In the present embodiment, the parameter Hu, which determines the control horizon, and the parameter Hw, which determines the start time of the coincidence horizon, are set to "1". The parameter Hp, which determines the end time of the coincidence horizon, is set to "2", and each of the weighting matrixes Q and R is set to a unit matrix whose diagonal elements are all "1" and other elements are all "0" (i.e., no weighting is substantially applied). Therefore, the matrixes SQ and SR, which are necessary to calculate the optimal input change amount $\Delta u(k)opt$, are given by equations (65) and (66), and the matrix $\Theta$ is given by equation (67). The matrixes $\psi$ and $\Gamma$, which are necessary to calculate the tracking error $\epsilon(k)$, and the target value vector T(k) are given by equations (68)-(70).

$$SQ = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \tag{65}$$

$$SR = \begin{bmatrix} 1 & 0 & 0 \\ 0 & 1 & 0 \\ 0 & 0 & 1 \end{bmatrix} \tag{66}$$

$$\Theta = \begin{bmatrix} B \\ AB \end{bmatrix} \tag{67}$$

$$\Psi = \begin{bmatrix} A \\ A^2 \end{bmatrix} \tag{68}$$

$$\Gamma = \begin{bmatrix} B \\ AB \end{bmatrix} \tag{69}$$

-continued $$T(k) = \begin{bmatrix} r(k+1) \\ r(k+2) \end{bmatrix} \tag{70}$$

The target value vector calculation block 91 of FIG. 8 calculates the target value vector T(k) as follows.

1) The present control deviation e(k) is calculated by equation (71). In equation (71), s(k) is an input to the target value vector calculation block 91 and given by equation (72) in this embodiment (hereinafter referred to as "setting value vector").

$$e(k) = s(k) - x(k) \tag{71}$$

$$S(k) = \begin{bmatrix} Piaref(k) \\ Pirref(k) \\ Peref(k) \end{bmatrix} \tag{72}$$

2) The control deviation e(k+i) after i steps (after discrete time period i has elapsed) is calculated by equation (73).

$$e(k+i) = \lambda^i \times e(k) \tag{73}$$

In equation (73), $\lambda$ is a parameter indicative of a speed at which the output x(k+i) approaches the target value r(k+i) ($\lambda$ is hereinafter referred to as "convergence speed parameter"). The convergence speed parameter $\lambda$ is set to a value between "0" and "1". The convergence speed becomes higher as the convergence speed parameter $\lambda$ is set to a smaller value.

3) The target value r(k+i) indicating the reference trajectory is calculated by equation (74).

$$r(k+i) = s(k+i) - e(k+i) \tag{74}$$

In this embodiment, the future setting value vector s(k+i) is set to be equal to the present setting value vector s(k) (i.e., the setting value vector s(k) is constant) and the target value vector T(k) is calculated by equation (75).

$$T(k) = \begin{bmatrix} Piaref(k) - \lambda(Piaref(k) - Piaest(k)) \\ Pirref(k) - \lambda(Pirref(k) - Pirest(k)) \\ Peref(k) - \lambda(Peref(k) - PE(k)) \\ Piaref(k) - \lambda^2(Piaref(k) - Piaest(k)) \\ Pirref(k) - \lambda^2(Pirref(k) - Pirest(k)) \\ Peref(k) - \lambda^2(Peref(k) - PE(k)) \end{bmatrix} \tag{75}$$

The delay block 95 delays the control input u(k) by one sampling period to output the control input u(k−1). The free response output calculation block 96 applies the control output x(k) and the control input u(k−1) to equation (76) to calculate a free response output xF.

$$XF = \Psi x(k) + \Gamma u(k-1) \tag{76}$$

Equation (76) is obtained by replacing $\Delta u(k)$ in equation (55) with "0", and the free response output xF corresponds to a control output obtained when the control input u(k) is constant.

The subtracting block 92 subtracts the free response output xF from the target value vector T(k). The optimal input change amount calculation block 93 calculates the optimal input change amount Δu(k)opt with equation (56). The accumulation block 94 accumulates the optimal input change amount Δu(k)opt to calculate the control input u(k). The model predictive controller 60 outputs the calculated control input $u(k)=(Gth(k)\ Gr(k)\ Gv(k))^T$ as the fresh air flow rate command value Gthcmd(k), the recirculated gas flow rate command value Grcmd(k), and the turbine gas flow rate command value Gvcmd(k).

FIGS. 9A-9F are time charts used for illustrating an example of the control operation in this embodiment. FIGS. 9A-9C illustrate changes in the control input u(k), i.e., Gthcmd(k), Grcmd(k), and Gvcmd(k), and FIGS. 9D-9F illustrate changes in the corresponding control output x(k), i.e., Piaest, Pirest, and PE. At time t1, the EGR valve 6 is opened to increase the recirculated gas partial pressure Pir in the intake pipe. At the same time, the vane opening of the turbine 11 is controlled to slightly change in the closing direction so as to maintain the exhaust pressure at a constant level. At time t2, the vane opening is controlled to change in the closing direction to increase the exhaust pressure PE, and at the same time, the opening of the EGR valve 6 is controlled to slightly change in the closing direction to maintain the recirculated gas partial pressure Pie at a constant level. At time t3, the throttle valve 3 is opened to increase the fresh air partial pressure Pia, and at the same time, the vane opening is controlled to greatly change in the opening direction to maintain the exhaust pressure PE at a constant level.

Thus, according to this embodiment, the fresh air partial pressure Pia and the recirculated gas partial pressure Pir in the intake pipe and the exhaust pressure PE, which are the gas parameters relevant to each other, independently converge to their corresponding target values. Therefore, the gas parameters are appropriately controlled according to the operating condition of the engine 1, thereby obtaining the maximum performance of the engine 1.

According to the intake gas state control block 43, the estimated fresh air partial pressure Piaest and the estimated recirculated gas partial pressure Pirest, which are estimated values of the intake gas state parameters, as well as the target value Peref of the exhaust pressure and the target values Piaref and Pirref of the fresh air partial pressure and recirculated gas partial pressure in the intake pipe, are each calculated. Further, the vane opening of the turbine 11, the opening of the EGR valve 6, and the opening of the throttle valve 3 are controlled using the model predictive control so that the detected exhaust pressure PE, the estimated fresh air partial pressure Piaest, and the estimated recirculated gas partial pressure Pirest, respectively, coincide with the corresponding target values Peref, Piaref, and Pirref. Consequently, the state of the intake gases is optimally controlled and the optimal state of the exhaust gases is maintained.

By using the model predictive control, a plurality of outputs of the controlled object having a plurality of inputs and outputs, i.e., the exhaust pressure PE, the fresh air partial pressure Pia, and the recirculated gas partial pressure Pir are made to simultaneously converge to the corresponding target values at the same speed. Consequently, the flow rate control of gases (the fresh air and the recirculated exhaust gases) supplied to the engine is performed completely and precisely, thereby obtaining maximum engine performance. Further, if the controlled object model is defined by equations, the control system performing the model predictive control is easily configured. Therefore, the control system is easily applied to various hardware configurations. In other words, the control system has an advantage of flexibility and greatly reduces the manpower required for setting the maps essential for the control.

The demand intake pressure Pides, which is a steady state target value corresponding to a steady state of the engine 1, is calculated by the demand intake pressure calculation block 72 according to the engine rotational speed NE and the demand torque TRQ. The target intake pressure Piref is calculated by selecting the smaller one of the detected boost pressure PB and the demand intake pressure Pides. Further, the target recirculated gas partial pressure Pirref is set to an available value based on the target intake pressure Piref. Accordingly, the target intake pressure Piref and the target recirculated gas partial pressure Pirref are prevented from being set to inappropriate values that are impossible to be controlled due to a delay of change in the boost pressure.

Further, the target power Wcref of the compressor wheel 15 is calculated according to the atmospheric pressure PA, the demand intake pressure Pides, and the demand fresh air flow rate Giades. The estimated actual power Wcest of the compressor wheel 15 is calculated according to the detected boost pressure PB and the detected fresh air flow rate GA. The target exhaust pressure Peref is calculated so that the estimated actual power Wcest of the compressor wheel 15 coincides with the target power Wcref. Further, the vane opening, the EGR valve opening, and the throttle valve opening are calculated so that the detected exhaust pressure PE coincides with the calculated target exhaust pressure Peref. In other words, cascade control is performed wherein the master feedback control is performed in the calculation of the target exhaust pressure Peref and the slave feedback control is performed in the calculation of the control amounts of the flow rate control mechanisms (the movable vanes 12 of the turbine, the EGR valve 6, and the throttle valve 3). Therefore, control performance of the boost pressure control, which has a relatively low or slow response speed, is improved.

The controlled object model is defined using the mass flow rates Gv, Gr, and Gth of the gases passing through the movable vane 12, the EGR valve 6, and the throttle valve 3 as control inputs (i.e., equations (34)-(38)). Therefore, the equations defining the controlled object model are simplified to reduce the calculation load on the CPU in the ECU 20, compared with the case where the control amounts of the movable vane 12, the EGR valve 6, and the throttle valve 3 are used as the control inputs. Further, when the flow rate characteristic of the movable vane 12, the EGR valve 6, or the throttle valve 3 is changed, only a change in the conversion characteristic for converting the flow rate to the valve opening is necessary, and no change in the control logic of the controller 60, which performs the model predictive control, is necessary. Further, by adding a local feedback control wherein the opening of the movable vane 12, the opening of the EGR valve 6, and the opening of the throttle valve 3 are controlled in a feedback manner, control performance against disturbance to the vane opening or the valve opening is improved. The resulting improvement in control performance is an effect of the cascade control which becomes more significant when the response speed of the actual valve opening to the valve opening command value is sufficiently fast compared with the behavior of intake gases and exhaust gases that are the controlled object of the controller 60.

Figure 10:
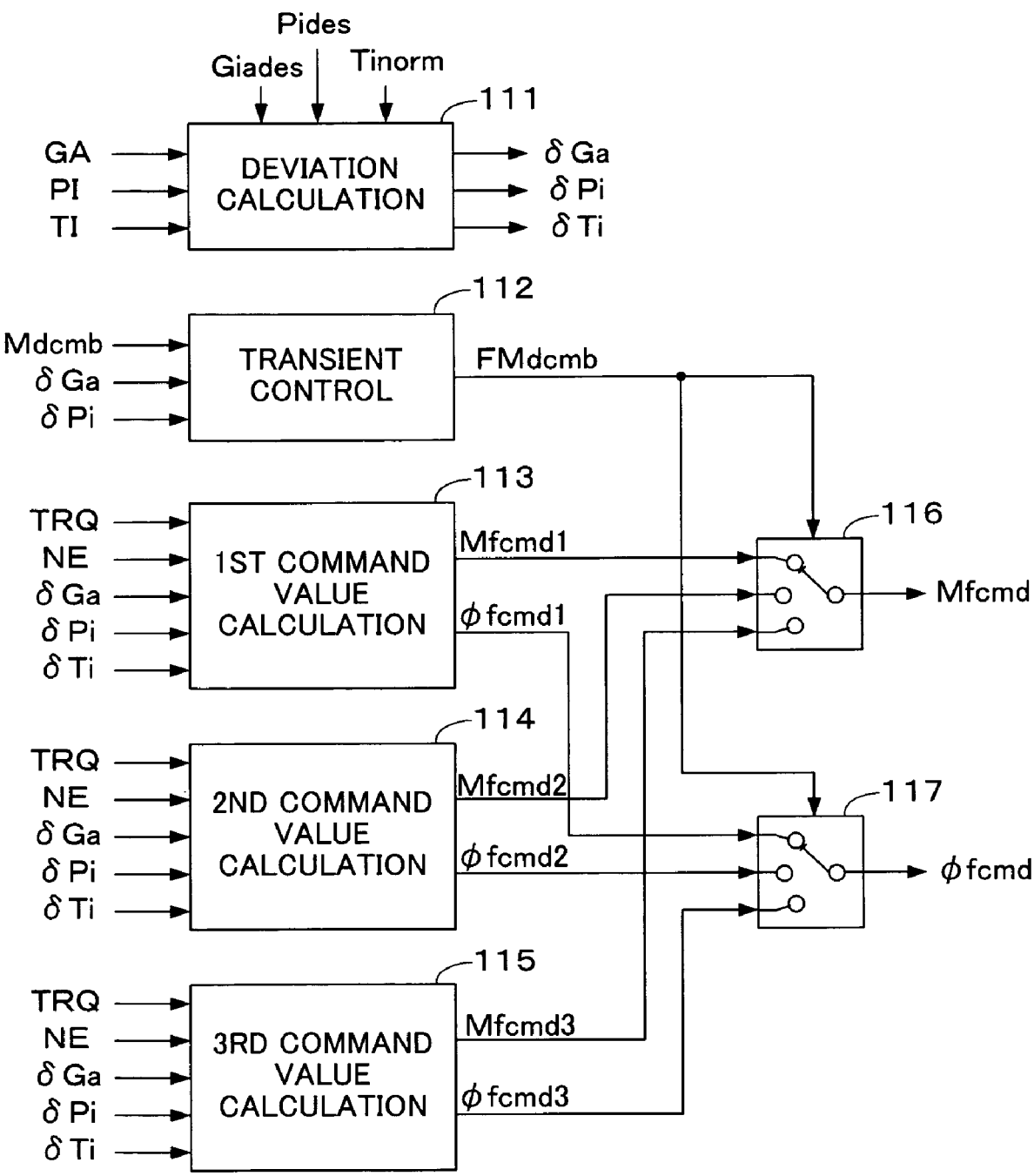
FIG. 10 is a block diagram showing a configuration of a fuel injection control block shown in FIG. 2.

FIG. 10 is a block diagram showing a configuration of the fuel injection control block 44 of FIG. 2. The fuel injection control block 44 includes a deviation calculation block 111, a transient control block 112, a first command value calculation block 113, a second command value calculation block 114, a third command value calculation block 115, and switching blocks 116 and 117.

The fuel injection control block 44 calculates the fuel injection amount command value Mfcmd and the fuel injection timing command value φfcmd according to five input parameters (TRQ, NE, GA, PI, TI). If the method of calculating the above-discussed command values using a 5-dimensional map is adopted, the number of combinations of setpoints becomes enormous, making it very difficult to perform the method. In this embodiment, the method of calculating the fuel injection amount command value Mfcmd and the fuel injection timing command value φfcmd to be optimal for the values of five input parameters (TRQ, NE, GA, PI, TI) using a plurality of 2-dimensional maps, wherein the demand torque TRQ and the engine rotational speed NE are used as input parameters, is adopted.

Specifically, the function f(r,s,x,y,z) defined by five input parameters r, s, x, y, and z is approximated by equation (101)

$$f(r, s, x, y, z) \cong f(r, s)\Big|_{(xsp,ysp,zsp)} + (x - xsp)\frac{\partial f(r, s)}{\partial x}\Big|_{(xsp,ysp,zsp)} + \quad (101)$$
$$(y - ysp)\frac{\partial f(r, s)}{\partial y}\Big|_{(xsp,ysp,zsp)} + (z - zsp)\frac{\partial f(r, s)}{\partial z}\Big|_{(xsp,ysp,zsp)}$$

where, $f(r,s)|_{(xsp,ysp,zsp)}$ indicates a value of the function f(r, s) when the parameters x, y, and z are respectively equal to set values xsp, ysp, and zsp, and a partial differential coefficient value $\partial f(r,s)/\partial x|_{(xsp,ysp,zsp)}$, and the like, are the same.

In this embodiment, the demand torque TRQ and the engine rotational speed NE, respectively, correspond to parameters r and s. The intake air flow rate GA, the intake pressure PI, and the intake gas temperature TI, respectively, correspond to parameters x, y, and z. The demand fresh air flow rate Giades, the demand intake pressure Pides, and the reference intake gas temperature Tinorm, respectively, correspond to set values xsp, ysp, and zsp.

Therefore, by setting f(r,s), ∂f(r,s)/∂x, ∂f(r,s)/∂y, and ∂f(r,s)/∂z, respectively, as a basic value (Mf, φf), a flow rate change rate parameter (Dmfga, Dφfga), a pressure change rate parameter (Dmfpi, Dφfpi), and an intake gas temperature change rate parameter (Dmfti, Dφfti) in maps according to the demand torque TRQ and the engine rotational speed NE, the fuel injection amount command value Mfcmd and the fuel injection timing command value φfcmd can be obtained by retrieving four 2-dimensional maps and performing the calculation in equation (101).

The fuel injection control block 44 calculates the fuel injection amount command value Mfcmd and the fuel injection timing command value φfcmd using the above-described method.

The deviation calculation block 111 calculates a fresh air flow rate deviation δGa, an intake pressure deviation δPi, and an intake gas temperature deviation δTi using equations (102)-(104). The deviations correspond to (x−xsp), (y−ysp), and (z−zsp) in equation (101).

$$\delta Ga = GA - Giades \quad (102)$$

$$\delta Pi = PI - Pides \quad (103)$$

$$\delta Ti = TI - Tinorm \quad (104)$$

The transient control block 112 calculates a modified combustion mode parameter FMdcmb according to the combustion mode parameter Mdcmb, the fresh air flow rate deviation δGa, and the intake pressure deviation δPi. When the operating condition of the engine 1 is in a steady state, the modified combustion mode parameter FMdcmb is equal to the combustion mode parameter Mdcmb. When the combustion mode parameter Mdcmb is changed (for example, when changed from "1" to "2"), the modified combustion mode parameter FMdcmb is maintained at the preceding value ("1") if at least one of the fresh air flow rate deviation δGa and the intake pressure deviation δPi is equal to or greater than a predetermined deviation amount. When both of the fresh air flow rate deviation δGa and the intake pressure deviation δPi become less than the corresponding predetermined deviation amounts, the modified combustion mode parameter FMdcmb is set to the changed combustion mode parameter Mdcmb ("2").

The first command value calculation block 113 calculates a first fuel injection amount Mfcmd1 and a first fuel injection timing φfcmd1 suitable for the lean combustion mode according to the demand torque TRQ, the engine rotational speed NE, the fresh air flow rate deviation δGa, the intake pressure deviation δPi, and the intake gas temperature deviation δTi. The second command value calculation block 114 calculates a second fuel injection amount Mfcmd2 and a second fuel injection timing φfcmd2 suitable for the rich combustion mode according to the demand torque TRQ, the engine rotational speed NE, the fresh air flow rate deviation δGa, the intake pressure deviation δPi, and the intake gas temperature deviation δTi. The third command value calculation block 115 calculates a third fuel injection amount Mfcmd3 and a third fuel injection timing φfcmd3 suitable for the premix combustion mode according to the demand torque TRQ, the engine rotational speed NE, the fresh air flow rate deviation δGa, the intake pressure deviation δPi, and the intake gas temperature deviation δTi.

The switching block 116 selects any one of the first-to-third fuel injection amounts Mfcmd1, Mfcmd2, and Mfcmd3 according to the modified combustion mode parameter FMdcmb and outputs the selected one of the fuel injection amounts as the fuel injection amount command value Mfcmd. The switching block 117 selects any one of the first-to-third fuel injection timings φfcmd1, φfcmd2, and φfcmd3 according to the modified combustion mode parameter FMdcmb and outputs the selected one of the fuel injection timings as the fuel injection timing command value φfcmd. That is, the first fuel injection amount Mfcmd1 and the first fuel injection timing φfcmd1 are selected when the FMdcmb is equal to "1", the second fuel injection amount Mfcmd2 and the second fuel injection timing φfcmd2 are selected when FMdcmb is equal to "2", and the third fuel injection amount Mfcmd3 and the third fuel injection timing φfcmd3 are selected when FMdcmb is equal to "3".

Figure 11:
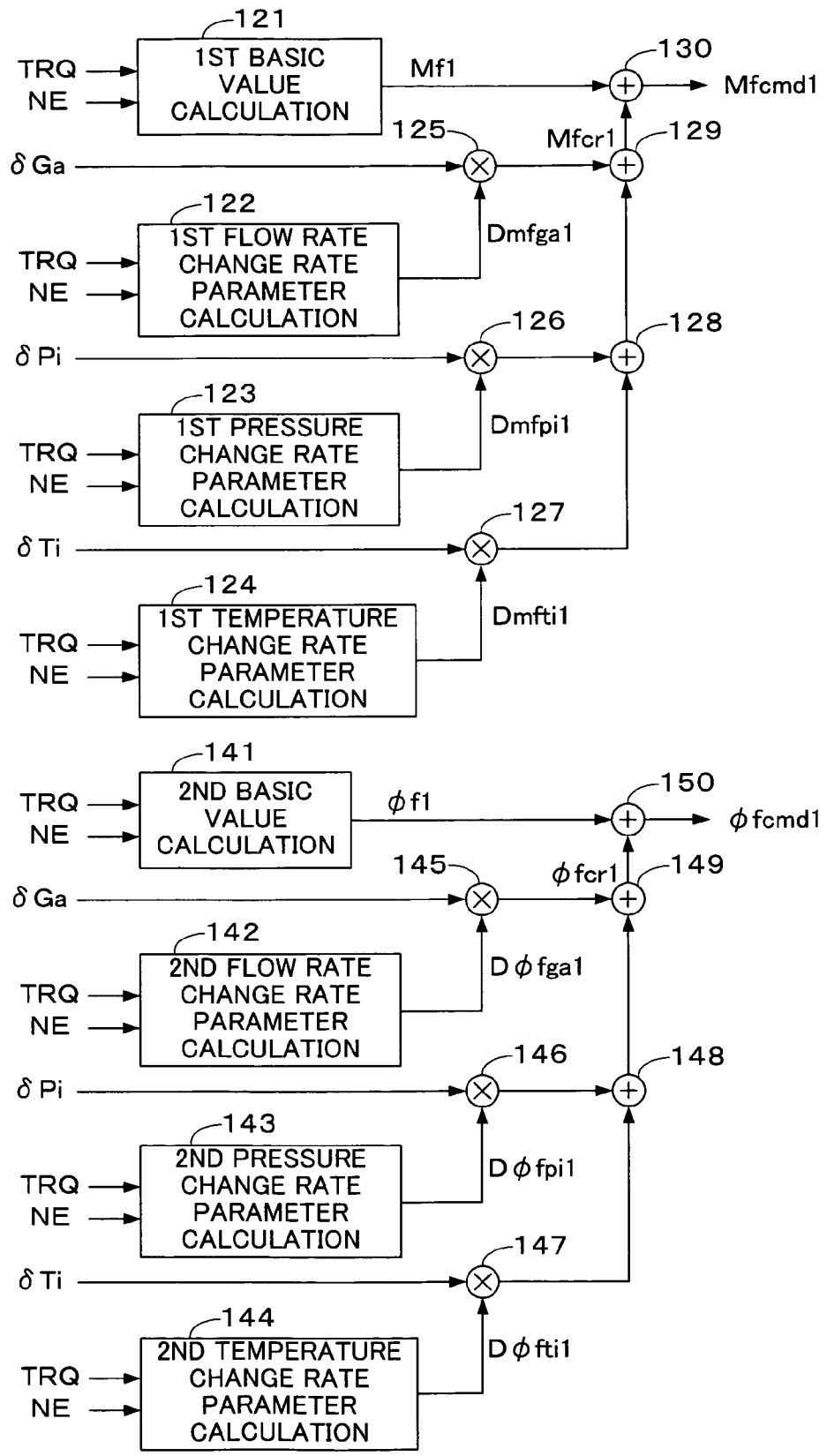
FIG. 11 is a block diagram showing a first command value calculation block in FIG. 10.

FIG. 11 is a block diagram showing a configuration of the first command value calculation block 113. The first command value calculation block 113 includes first and second basic value calculation blocks 121, 141; first and second flow rate change rate parameter calculation blocks 122, 142; first and second pressure change rate parameter calculation blocks 123, 143; first and second temperature change rate parameter calculation blocks 124, 144; multiplying blocks 125-127 and 145-147; and adding blocks 128-130 and 148-150.

The first basic value calculation block 121 retrieves a Mf1 map according to the demand torque TRQ and the engine rotational speed NE to calculate a first fuel injection amount basic value Mf1. The first flow rate change rate parameter calculation block 122 retrieves a Dmfga1 map according to the demand torque TRQ and the engine rotational speed NE to calculate a first flow rate change rate parameter Dmfga1. The first pressure change rate parameter calculation block 123 retrieves a Dmfpi1 map according to the demand torque TRQ and the engine rotational speed NE to calculate a first pressure change rate parameter Dmfpi1. The first temperature change rate parameter calculation block 124 retrieves a Dmfti1 map according to the demand torque TRQ and the engine rotational speed NE to Calculate a first temperature change rate parameter Dmfti1.

On the above-described Mf1 map, Dmfga1 map, Dmfpi1 map, and Dmfti1 map, values suitable for the lean combustion mode are set, and grid points defined by a value of the demand torque TRQ and the engine rotational speed NE are set to be the same as the grid points of the map used in the first demand value setting block 101.

The multiplying block 125 multiplies the first flow rate change rate parameter Dmfga1 by the fresh air flow rate deviation δGa. The multiplying block 126 multiplies the first pressure change rate parameter Dmfpi1 by the intake pressure deviation δPi. The multiplying block 127 multiplies the first temperature change rate parameter Dmfti1 by the intake gas temperature deviation δTi. The adding blocks 128 and 129 add the outputs of the multiplying blocks 125-127 to calculate a first fuel injection amount correction value Mfcr1. The adding block 130 adds the first fuel injection amount correction value Mfcr1 to the first fuel injection amount basic value Mf1 to calculate the first fuel injection amount Mfcmd1.

The second basic value calculation block 141 retrieves a φf1 map according to the demand torque TRQ and the engine rotational speed NE to calculate a first fuel injection timing basic value φf1. The second flow rate change rate parameter calculation block 142 retrieves a Dφfga1 map according to the demand torque TRQ and the engine rotational speed NE to calculate a second flow rate change rate parameter Dφfga1. The second pressure change rate parameter calculation block 143 retrieves a Dφfpi1 map according to the demand torque TRQ and the engine rotational speed NE to calculate a second pressure change rate parameter Dφfpi1. The second temperature change rate parameter calculation block 144 retrieves a Dφfti1 map according to the demand torque TRQ and the engine rotational speed NE to calculate a second temperature change rate parameter Dφfti1.

On the above-described φf1 map, Dφfga1 map, Dφfpi1 map, and Dφfti1 map, values suitable for the lean combustion mode are set, and grid points defined by the demand torque TRQ and the engine rotational speed NE are set to be the same as the grid points of the map used in the first demand value setting block 101.

The multiplying block 145 multiplies the second flow rate change rate parameter Dφfga1 by the fresh air flow rate deviation δGa. The multiplying block 146 multiplies the second pressure change rate parameter Dφfpi1 by the intake pressure deviation δPi. The multiplying block 147 multiplies the second temperature change rate parameter Dφfti1 by the intake gas temperature deviation δTi. The adding blocks 148 and 149 add the outputs of the multiplying blocks 145-147 to calculate a first fuel injection timing correction value φfcr1. The adding block 150 adds the first fuel injection timing correction value φfcr1 to the first fuel injection timing basic value φf1 to calculate the first fuel injection timing φfcmd1.

Therefore, the calculations of the first fuel injection amount Mfcmd1 and the first fuel injection timing φfcmd1 in the first command value calculation block 113 are respectively expressed by equations (105) and (106).

$$Mfcmd1 = Mf1 + Mfcr1 \quad (105)$$
$$= Mf1 + \delta Ga \times Dmfga1 +$$
$$\delta Pi \times Dmfpi1 + \delta Ti \times Dmfti1$$

$$\phi fcmd1 = \phi f1 + \phi fcr1 \quad (106)$$
$$= \phi f1 + \delta Ga \times D\phi fga1 +$$
$$\delta Pi \times D\phi fpi1 + \delta Ti \times D\phi fti1$$

The second command value calculation block 114 and the third command value calculation block 115 shown in FIG. 10 are configured similarly as the first command value calculation block 113. Similarly, the second fuel injection amount Mfcmd2, the second fuel injection timing φfcmd2, the third fuel injection amount Mfcmd3, and the third fuel injection timing φfcmd3 are calculated by equations (107)-(110).

$$Mfcmd2 = Mf2 + Mfcr2 \quad (107)$$
$$= Mf2 + \delta Ga \times Dmfga2 +$$
$$\delta Pi \times Dmfpi2 + \delta Ti \times Dmfti2$$

$$\phi fcmd2 = \phi f2 + \phi fcr2 \quad (108)$$
$$= \phi f2 + \delta Ga \times D\phi fga2 +$$
$$\delta Pi \times D\phi fpi2 + \delta Ti \times D\phi fti2$$

$$Mfcmd3 = Mf3 + Mfcr3 \quad (109)$$
$$= Mf3 + \delta Ga \times Dmfga3 +$$
$$\delta Pi \times Dmfpi3 + \delta Ti \times Dmfti3$$

$$\phi fcmd3 = \phi f3 + \phi fcr3 \quad (110)$$
$$= \phi f3 + \delta Ga \times D\phi fga3 +$$
$$\delta Pi \times D\phi fpi3 + \delta Ti \times D\phi fti3$$

Figure 12:
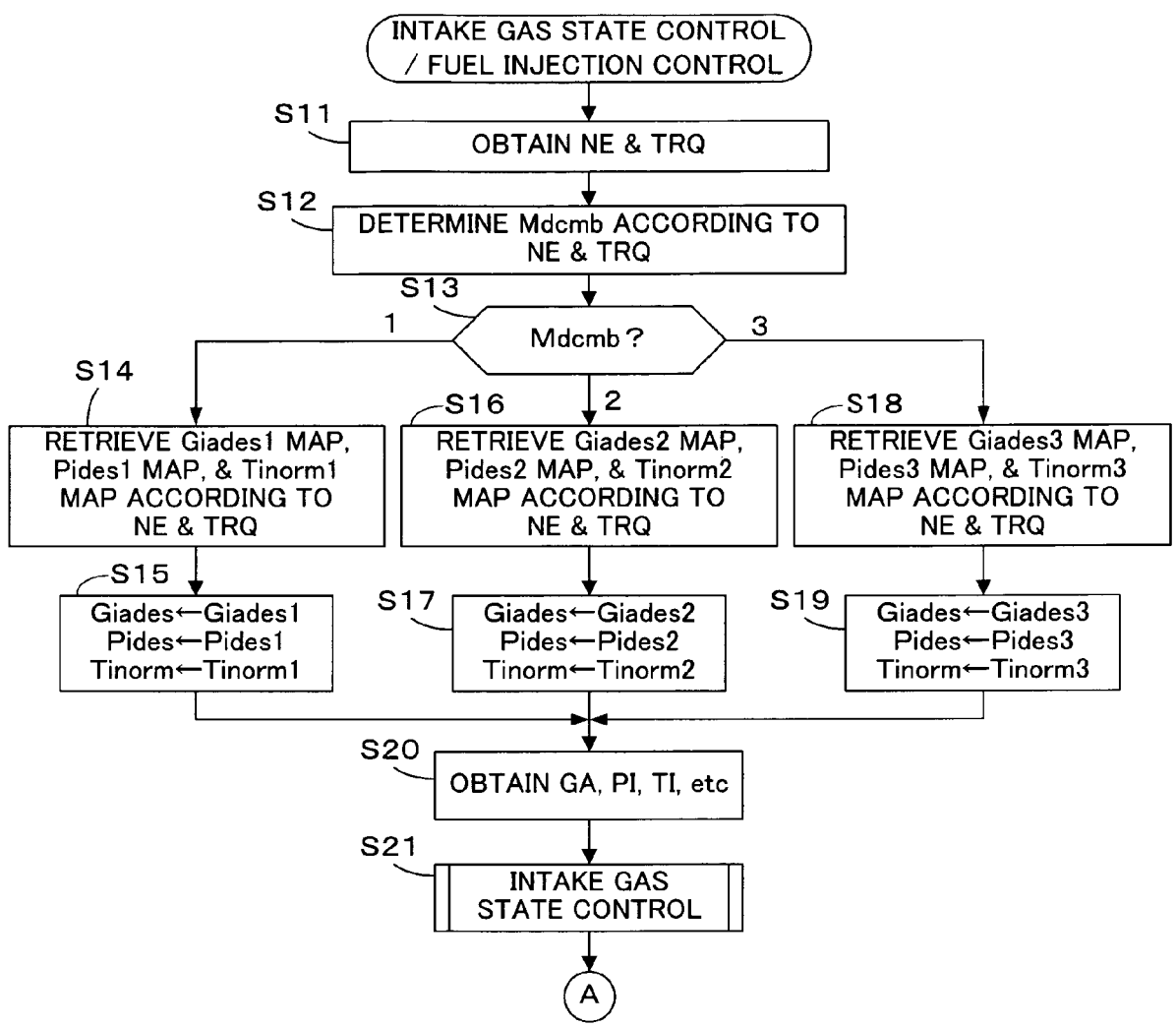
FIG. 12 is a flowchart of a process for performing intake gas state control and fuel injection control.
Figure 13:
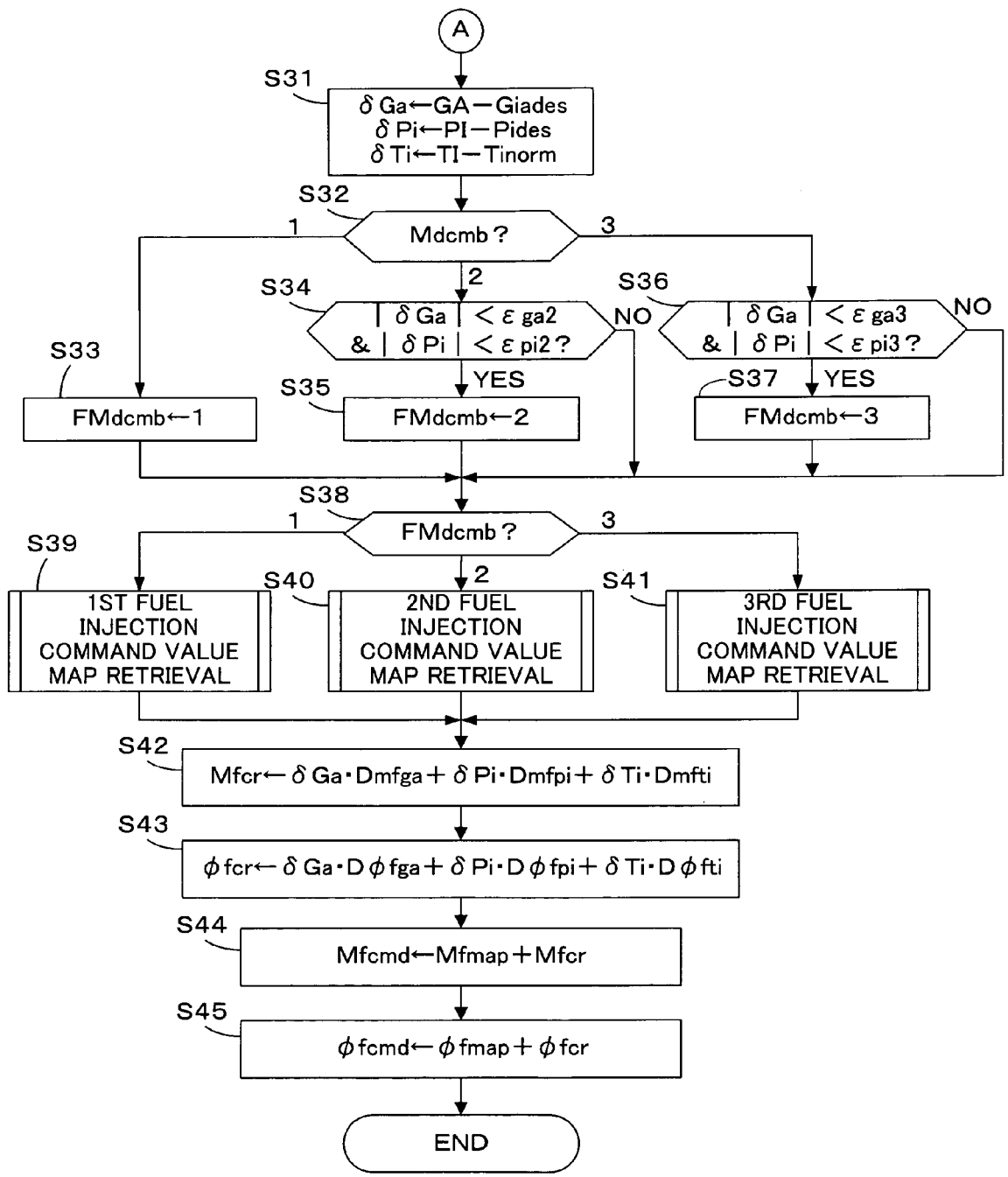
FIG. 13 is a flowchart of a process for performing intake gas state control and fuel injection control.

FIGS. 12 and 13 each show a flowchart of a process for executing the above-described intake gas state control and the fuel injection control. The process is executed at predetermined time intervals (for example, 10 milliseconds) by the CPU in the ECU 20.

In step S11, the detected engine rotational speed NE and the demand torque TRQ are obtained, and the combustion mode parameter Mdcmb is determined according to the engine rotational speed NE and the demand torque TRQ (step S12). If the selected combustion mode is the lean combustion mode, the combustion mode parameter Mdcmb is set to "1". If the selected combustion mode is the rich combustion mode, the combustion mode parameter Mdcmb is set to "2". If the selected combustion mode is the premix combustion mode, the combustion mode parameter Mdcmb is set to "3".

In step S13, it is determined whether the value of the combustion mode parameter Mcmb is "1", "2", or "3". If the value of the combustion mode parameter Mcmb is "1", i.e., if the lean combustion mode is selected, the process proceeds to step S14, wherein the Giades1 map, the Pides1 map, and the Tinorm1 map are retrieved according to the engine rotational speed NE and the demand torque TRQ to calculate the first demand fresh air flow rate Giades1, the first demand intake pressure Pides1, and the first reference intake gas temperature Tinorm1. Next, the demand fresh air flow rate Giades, the demand intake pressure Pides, and the reference intake gas temperature Tinorm are set, respectively, to the calculated first demand fresh air flow rate Giades1, the first demand intake pressure Pides1, and the first reference intake gas temperature Tinorm1 (step S15).

If the value of the combustion mode parameter Mcmb is "2", i.e., if the rich combustion mode is selected, the process proceeds from step S13 to step S16, wherein the Giades2 map, the Pides2 map, and the Tinorm2 map are retrieved according to the engine rotational speed NE and the demand torque TRQ to calculate the second demand fresh air flow rate Giades2, the second demand intake pressure Pides2, and the second reference intake gas temperature Tinorm2. Next, the demand fresh air flow rate Giades, the demand intake pressure Pides, and the reference intake gas temperature Tinorm are set, respectively, to the calculated second demand fresh air flow rate Giades2, the second demand intake pressure Pides2, and the second reference intake gas temperature Tinorm2 (step S17).

If the value of the combustion mode parameter Mcmb is "3", i.e., if the premix combustion mode is selected, the process proceeds from step S13 to step S18, wherein the Giades3 map, the Pides3 map, and the Tinorm3 map are retrieved according to the engine rotational speed NE and the demand torque TRQ to calculate the third demand fresh air flow rate Giades3, the third demand intake pressure Pides3, and the third reference intake gas temperature Tinorm3. Next, the demand fresh air flow rate Giades, the demand intake pressure Pides, and the reference intake gas temperature Tinorm are set, respectively, to the calculated third demand fresh air flow rate Giades3, the third demand intake pressure Pides3, and the third reference intake gas temperature Tinorm3 (step S19).

In step S20, the detected parameters, such as the detected intake air flow rate GA, intake pressure PI, and intake gas temperature TI, are obtained. In step S21, the intake gas state control described above is performed, and the vane opening command value θvcmd, the throttle valve opening command value θthcmd, and the EGR valve opening command value θrcmd are calculated.

In step S31 of FIG. 13, the fresh air flow rate deviation δGa, the intake pressure deviation δPi, and the intake gas temperature deviation δTi are calculated. In step S32, like in step S13, it is determined whether the value of the combustion mode parameter Mcmb is "1", "2", or "3". If the value of the combustion mode parameter Mcmb is "1", i.e., if the lean combustion mode is selected, the process proceeds to step S33, wherein the modified combustion mode parameter FMdcmb is set to "1". Thereafter, the process proceeds to step S38.

If the value of the combustion mode parameter Mcmb is "2", i.e., if the rich combustion mode is selected, the process proceeds from step S32 to step S34, wherein it is determined whether the absolute value of the fresh air flow rate deviation δGa is less than a first predetermined threshold value εga2 (for example, 0.05×Giades), and the absolute value of the intake pressure deviation δPi is less than a second predetermined threshold value εpi2 (for example, 0.05×Pides). If the answer to step S34 is negative (NO), i.e., if |δGa| is greater than or equal to εga2, or |δPi| is greater than or equal to εpi2, the process proceeds to step S38 without changing the value of the modified combustion mode parameter FMdcmb (holding the preceding value). On the other hand, if the answer to step S34 is affirmative (YES), the modified combustion mode parameter FMdcmb is set to "2" (step S35) and the process proceeds to step S38.

If the value of the combustion mode parameter Mcmb is "3", i.e., if the premix combustion mode is selected, the process proceeds from step S32 to step S36, wherein it is determined whether the absolute value of the fresh air flow rate deviation δGa is less than a third predetermined threshold value εga3 (for example, 0.05×Giades), and the absolute value of the intake pressure deviation δPi is less than a fourth predetermined threshold value εpi3 (for example, 0.05× Pides). If the answer to step S36 is negative (NO), i.e., if |δGa| is greater than or equal to εga3, or |δPi| is greater than or equal to εpi3, the process proceeds to step S38 without changing the value of the modified combustion mode parameter FMdcmb (holding the preceding value). On the other hand, if the answer to step S36 is affirmative (YES), the modified combustion mode parameter FMdcmb is set to "3" (step S37) and the process proceeds to step S38.

In step S38, It is determined whether the value of the modified combustion mode parameter FMdcmb is "1", "2", or "3". If the value of the modified combustion mode parameter FMdcmb is "1", a first fuel injection command value map retrieval process is performed (step S39). If the value of the modified combustion mode parameter FMdcmb is "2", a second fuel injection command value map retrieval process is performed (step S40). If the value of the modified combustion mode parameter FMdcmb is "3", a third fuel injection command value map retrieval process is performed (step S41).

Figure 14:
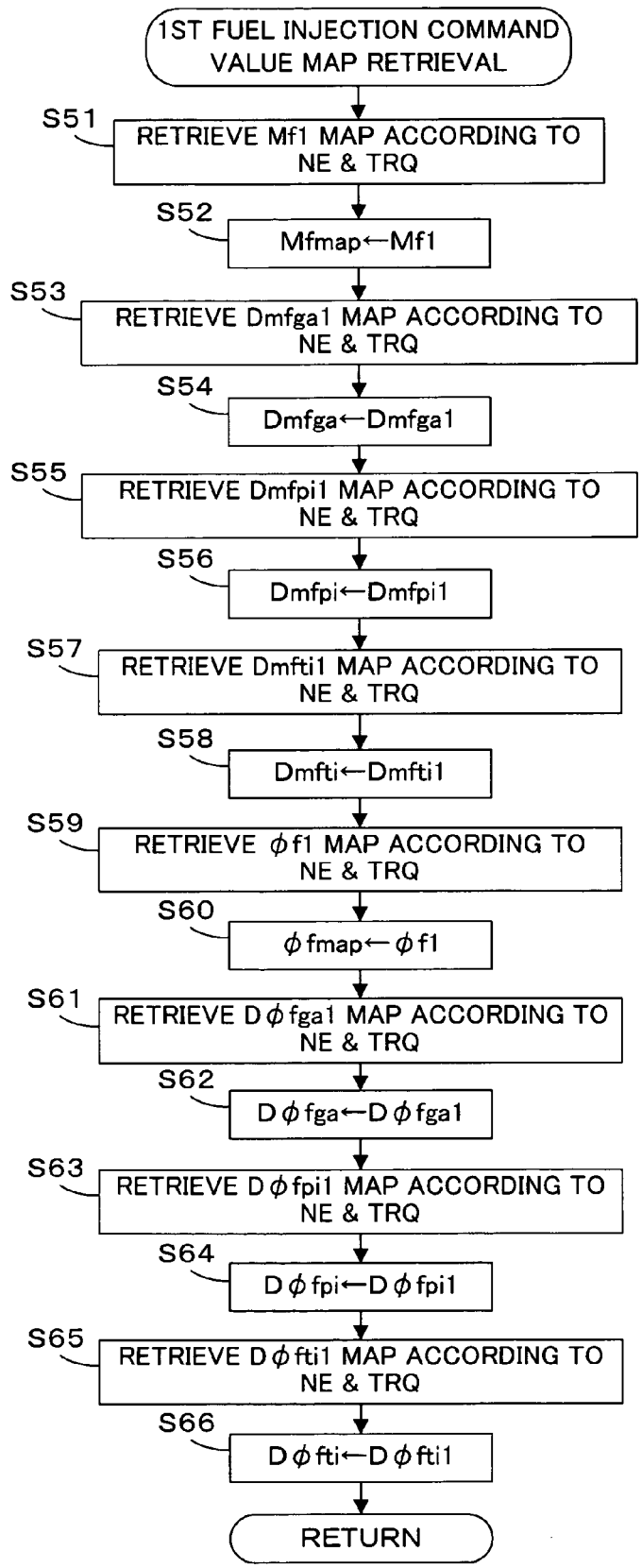
FIG. 14 is a flowchart of a first fuel injection command value map retrieval process executed in the process of FIG. 13.

FIG. 14 is a flowchart of the retrieval process performed in step S39.

In step S51, the Mf1 map is retrieved according to the engine rotational speed NE and the demand torque TRQ to calculate the first fuel injection amount basic value Mf1. In step S52, a basic fuel injection amount Mfmap is set to the first fuel injection amount basic value Mf1. In step S53, the Dmfga1 map is retrieved according to the engine rotational speed NE and the demand torque TRQ to calculate the first flow rate change rate parameter Dmfga1. In step S54, the flow rate change rate parameter Dmfga is set to the first flow rate change rate parameter Dmfga1.

In step S55, the Dmfpi1 map is retrieved according to the engine rotational speed NE and the demand torque TRQ to calculate the first pressure change rate parameter Dmfpi1. The pressure change rate parameter Dmfpi is set to the first pressure change rate parameter Dmfpi1 in step S56. In step S57, the Dmfti1 map is retrieved according to the engine rotational speed NE and the demand torque TRQ to calculate the first temperature change rate parameter Dmfti1. The temperature change rate parameter Dmfti is set to the first temperature change rate parameter Dmfti1 in step S58.

In step S59, the $\phi$f1 map is retrieved according to the engine rotational speed NE and the demand torque TRQ to calculate the fuel injection timing basic value $\phi$f1. The basic fuel injection timing $\phi$fmap is set to the fuel injection timing basic value $\phi$f1 in step S60. In step S61, the D$\phi$fga1 map is retrieved according to the engine rotational speed NE and the demand torque TRQ to calculate the second flow rate change rate parameter D$\phi$fga1. The flow rate change rate parameter D$\phi$fga is set to the second flow rate change rate parameter D$\phi$fga1 in step S62.

In step S63, the $\phi$fpi1 map is retrieved according to the engine rotational speed NE and the demand torque TRQ to calculate the second pressure change rate parameter D$\phi$fpi1. The pressure change rate parameter D$\phi$fpi is set to the second pressure change rate parameter D$\phi$fpi1 in step S64. In step S65, the D$\phi$fti1 map is retrieved according to the engine rotational speed NE and the demand torque TRQ to calculate the second temperature change rate parameter D$\phi$fti1. The temperature change rate parameter D$\phi$fti is set to the second temperature change rate parameter D$\phi$fti1 in step S66.

As described above, the basic fuel injection amount Mfmap, the first flow rate change rate parameter Dmfga, the first pressure change rate parameter Dmfpi, the first temperature change rate parameter Dmfti, the basic fuel injection timing $\phi$fmap, the second flow rate change rate parameter D$\phi$fga, the second pressure change rate parameter D$\phi$fpi, and the second temperature change rate parameter Dphifti, all of which are suitable for the lean combustion mode, are calculated.

Referring back to FIG. 13, the second fuel injection command value map retrieval process and the third fuel injection command value map retrieval process of steps S40 and S41 are configured similarly to the first fuel injection command value map retrieval process of FIG. 14. That is, in the second fuel injection command value map retrieval process, the basic fuel injection amount Mfmap, the first flow rate change rate parameter Dmfga, the first pressure change rate parameter Dmfpi, the first temperature change rate parameter Dmfti, the basic fuel injection timing $\phi$fmap, the second flow rate change rate parameter D$\phi$fga, the second pressure change rate parameter D$\phi$fpi, and the second temperature change rate parameter Dphifti, all of which are suitable for the rich combustion mode, are calculated. In the third fuel injection command value map retrieval process, the basic fuel injection amount Mfmap, the first flow rate change rate parameter Dmfga, the first pressure change rate parameter Dmfpi, the first temperature change rate parameter Dmfti, the basic fuel injection timing $\phi$fmap, the second flow rate change rate parameter D$\phi$fga, the second pressure change rate parameter D$\phi$fpi, and the second temperature change rate parameter D$\phi$fti, all of which are suitable for the premix combustion mode, are calculated.

In step S42, the fuel injection amount correction value Mfcr is calculated by equation (111). In step S43, the fuel injection timing correction value $\phi$fcr is calculated by equation (112).

$$Mfcr = \delta Ga \times Dmfga + \delta Pi \times Dmfpi + \delta Ti \times Dmfti \tag{111}$$

$$\phi fcr = \delta Ga \times D\phi fga + \delta Pi \times D\phi fpi + \delta Ti \times D\phi fti \tag{112}$$

In step S44, the fuel injection amount command value Mfcmd is calculated by equation (113). In step S45, the fuel injection timing command value $\phi$fcmd is calculated by equation (114).

$$Mfcmd = Mfmap + Mfcr \tag{113}$$

$$\phi fcmd = \phi fmap + \phi fcr \tag{114}$$

As described above, in this embodiment, the intake air flow rate GA, the intake pressure PI, and the intake gas temperature TI are detected as the intake gas state parameters indicative of the intake gas state (fresh air and recirculated exhaust gases) of the engine 1, and the demand values of the intake gas state parameters, i.e., the demand fresh air flow rate Giades, the demand intake pressure Pides, and the reference intake gas temperature Tinorm are calculated according to the engine rotational speed NE and the demand torque TRQ which indicate the engine operating condition. The intake gas state is controlled so that the intake air flow rate GA and the intake pressure PI coincide, respectively, with the demand fresh air flow rate Giades and the demand intake pressure Pides. Further, the fuel injection amount command value Mfcmd and the fuel injection timing command value $\phi$fcmd are calculated according to the engine rotational speed NE, the demand torque TRQ, and the deviations of the intake air flow rate GA, the intake pressure PI, and the intake gas temperature TI from the corresponding demand values (Giades, Pides) and the reference value (Tinorm), and the fuel injection valve 9 is controlled according to the calculated command values. Therefore, the desired intake gas state according to the engine operating condition is realized, control of the fuel injection amount and the fuel injection timing, which is suitable for the intake gas state is performed, wherein good engine operating performance and exhaust characteristics are obtained.

Specifically, the basic fuel injection amount Mfmap and the basic fuel injection timing $\phi$fmap are calculated according to the engine rotational speed NE and the demand torque TRQ. Further, the first flow rate change rate parameter Dmfga, the first pressure change rate parameter Dmfpi, and the first temperature change rate parameter Dmfti, which indicate the change rate of the basic fuel injection amount Mfmap, are calculated according to the engine rotational speed NE and the demand torque TRQ. Also, the second flow rate change rate parameter D$\phi$fga, the second pressure change rate parameter D$\phi$fpi, and the second temperature change rate parameter D$\phi$fti, which indicate the change rate of the basic fuel injection timing $\phi$fmap, are calculated according to the engine rotational speed NE and the demand torque TRQ. Further, the correction values Mfcr and $\phi$fcr are calculated by multiplying the fresh air flow rate deviation $\delta$Ga, the intake pressure deviation δPi, and the intake gas temperature deviation δTi, which indicate the deviations of the detected intake gas state parameters from the demand values or the reference value, respectively, by the corresponding change rate parameters (Dmfga, Dmfpi, Dmfti, Dphifga, Dphifpi, Dphifti), and adding the products of the multiplications. Further, the fuel injection amount command value Mfcmd and the fuel injection timing command value φfcmd are calculated by adding the correction values Mfcr and φfcr, respectively, to the basic fuel injection amount Mfmap and the basic fuel injection timing φfmap. Subsequently, the fuel injection control is performed by the calculated command values. Therefore, even if the intake gas state parameters GA, PI, and TI do not completely coincide with the corresponding demand values or the reference value, appropriate command values of the fuel injection amount and the fuel injection timing are obtained according to the deviations δGa, δPi, and δTi and accurate fuel injection control is performed. Further, since the correction values Mfcr and φfcr are calculated by multiplying the change rate parameters by the deviations δGa, δPi, and δTi, the number of set-points in the maps for calculating the fuel injection amount and the fuel injection timing suitable for the actual intake gas state parameter values is reduced. Accordingly, accurate fuel injection control is realized while suppressing the memory capacity and the manpower for setting the maps.

Further, by including the intake gas temperature TI in the intake gas state parameters, the control is performed in view of the influence of a change in the intake gas temperature, thereby improving accuracy of the control.

Further, the fuel injection amount command value Mfcmd and the fuel injection timing command value φfcmd are calculated using the maps set corresponding to the combustion modes. Accordingly, the optimal control values are obtained corresponding to each combustion mode.

When at least one of the absolute values of the fresh air flow rate deviation δGa and the intake pressure deviation δPi is greater than the predetermined threshold values, immediately after the change in the combustion mode parameter Mdcmb to a value corresponding to the rich combustion mode or the premix combustion mode, the modified combustion mode parameter FMdcmb is maintained at the value before the change (FIG. 13, steps 34, S36), and the control maps corresponding to the combustion mode before the change are used. When both of the absolute values of the fresh air flow rate deviation δGa and the intake pressure deviation δPi become less than the predetermined threshold values, the modified combustion mode parameter FMdcmb is made to coincide with the combustion mode parameter Mdcmb (FIG. 13, steps S35, S37), and the control maps corresponding to the changed combustion mode are used. In the transient state after changing the combustion mode, the fresh air flow rate deviation δGa and the intake pressure deviation δPi tend to become large. Accordingly, the control is stabilized by using the control maps corresponding to the combustion mode before the change until the deviations become small.

In this embodiment, the fuel injection valve 9 corresponds to the fuel injection means. The intake air flow rate sensor 21, the intake gas temperature sensor 23, and the intake pressure sensor 24 correspond to the intake gas state parameter detecting means. The throttle valve 3, the EGR valve 6, and the movable vane 12 form a portion of the intake gas state control means, and the ECU 20 includes the combustion mode determining means, the demand value calculating means, the intake gas temperature reference value calculating means, a portion of the intake gas state control means, and the fuel injection control means. Specifically, the combustion mode determination block 41 corresponds to the combustion mode determining means. The intake gas state parameter demand value setting block 42 corresponds to the demand value calculating means and the intake gas temperature reference value calculating means. The intake gas state control block 43 corresponds to a portion of the intake gas state control means, and the fuel injection control block 44 corresponds to the fuel injection control means.

Second Embodiment

In this embodiment, the demand fresh air flow rate Giades, the demand intake pressure Pides, and a demand intake oxygen partial pressure Piodes are calculated according to the engine rotational speed NE and the demand torque TRQ. Also, intake gas state control is performed to realize the demand intake pressure Pides and the demand intake oxygen partial pressure Piodes. Further, the fuel injection control corresponding to the demand intake pressure Pides and the demand intake oxygen partial pressure Piodes is performed. The demand intake oxygen partial pressure Piodes is a demand value of a partial pressure of oxygen in the intake gases (hereinafter referred to as "intake oxygen partial pressure"). In this embodiment, the demand fresh air flow rate Giades is applied only to the calculation of the target power Wcref of the compressor wheel 15 in the intake gas state control block, i.e., the demand fresh air flow rate Giades does not correspond to the "intake gas state parameter" described in the claims.

Figure 15:
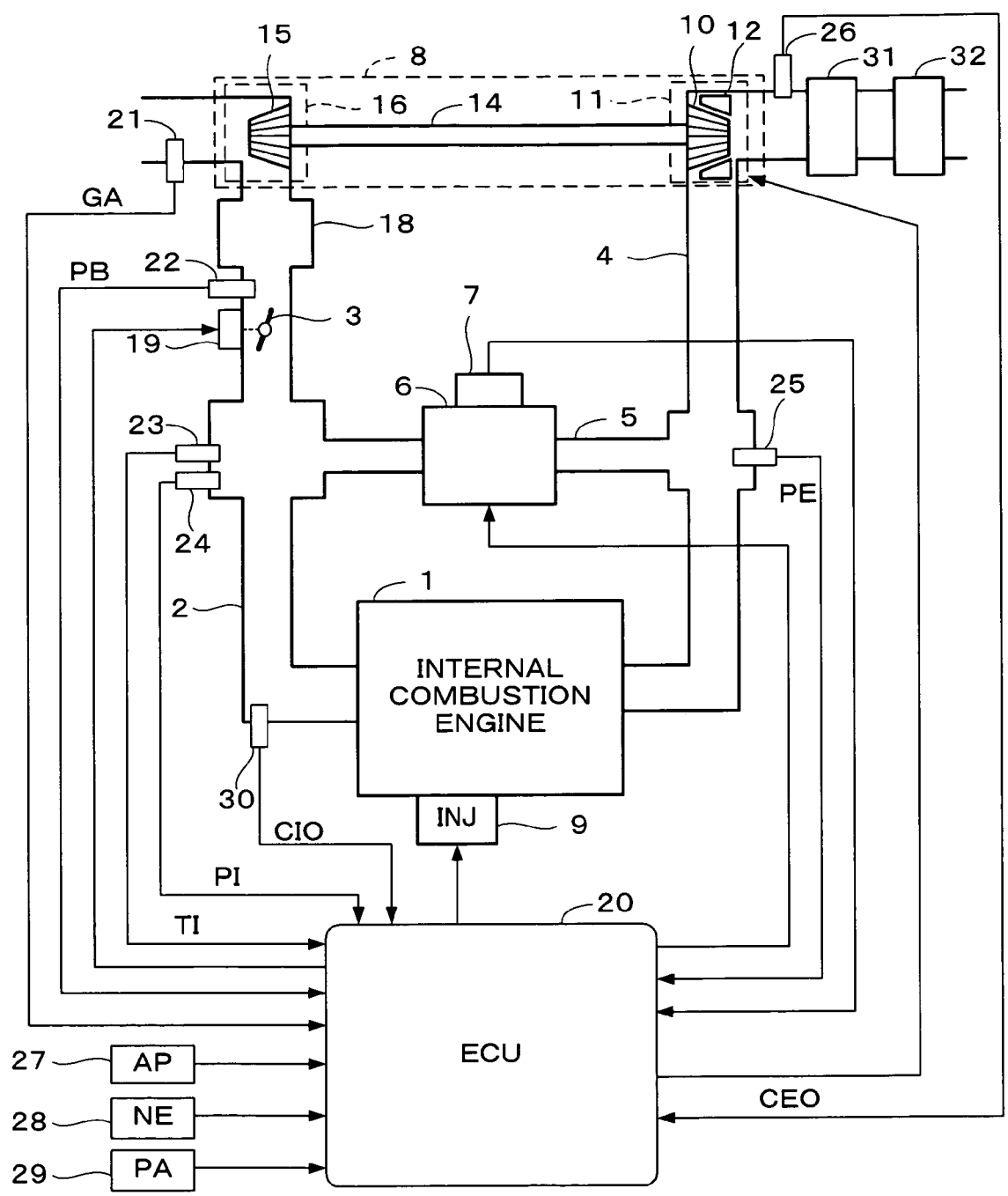
FIG. 15 is a schematic diagram of an internal combustion engine and a control system therefore according to a second embodiment of the present invention.

In order to perform a control contemplating the intake oxygen partial pressure, an intake oxygen concentration sensor 30 for detecting an oxygen concentration CIO in the intake gases is provided in the intake pipe 2 as shown in FIG. 15. Further, an exhaust oxygen concentration sensor 26 for detecting an oxygen concentration CEO in the exhaust gases is provided between the turbine 11 and the catalytic converter 31 in the exhaust pipe 4.

Figure 16:
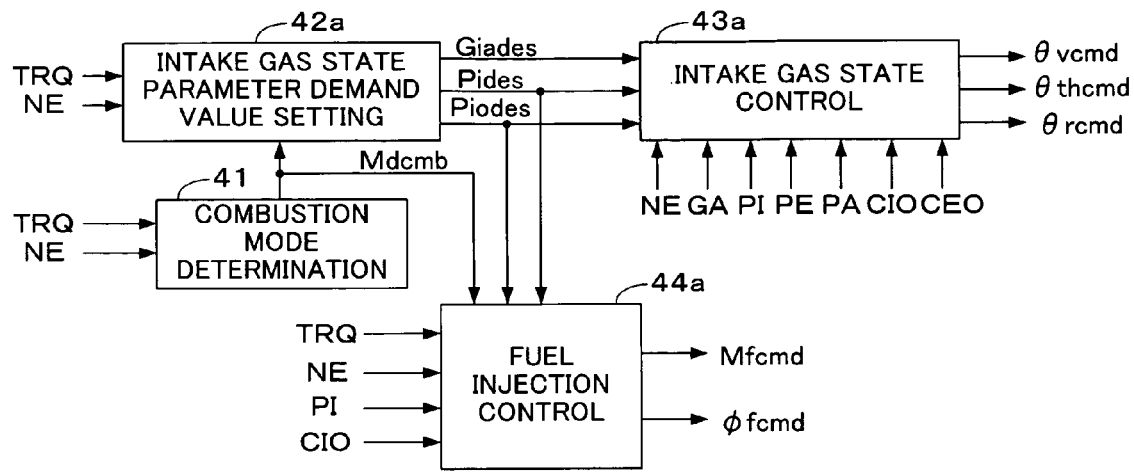
FIG. 16 is a block diagram showing a configuration of a control module for performing intake gas state control and fuel injection control of an internal combustion engine.

FIG. 16 is a block diagram showing a configuration of a control module which performs the intake gas state control and the fuel injection control in this embodiment. The control module includes the combustion mode determination block 41, an intake gas state parameter demand value setting block 42a, an intake gas state control block 43a, and a fuel injection control block 44a. The combustion mode determination block 41 is the same as the combustion mode determination block of the first embodiment (FIG. 2).

Figure 17:
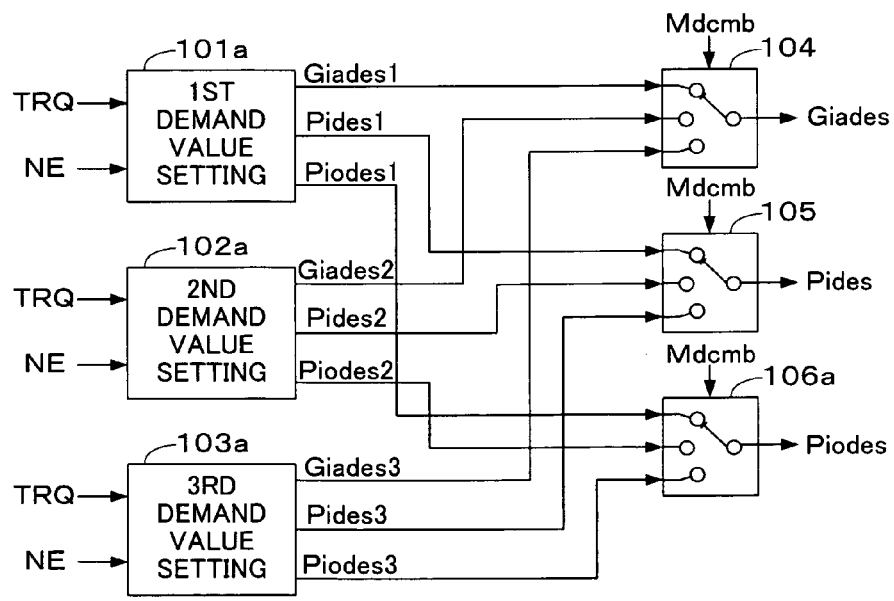
FIG. 17 is a block diagram showing a configuration of an intake gas state parameter demand value setting block shown in FIG. 16.

The intake gas state parameter demand value setting block 42a includes, as shown in FIG. 17, a first demand value setting block 101a, a second demand value setting block 102a, a third demand value setting block 103a, and switching blocks 104, 105, and 106a. The switching blocks 104, 105 are the same as the switching blocks 104, 105 shown in FIG. 3.

The first demand value setting block 101a retrieves the Giades1 map, the Pides1 map, and the Piodes1 map suitable for the lean combustion mode according to the engine rotational speed NE and the demand torque TRQ to calculate the first demand fresh air flow rate Giades1, the first demand intake pressure Pides1, and a first demand intake oxygen partial pressure Piodes1. The second demand value setting block 102a retrieves the Giades2 map, the Pides2 map, and the Piodes2 map suitable for the rich combustion mode according to the engine rotational speed NE and the demand torque TRQ to calculate the second demand fresh air flow rate Giades2, the second demand intake pressure Pides2, and a second demand intake oxygen partial pressure Piodes2. The third demand value setting block 103a retrieves the Giades3 map, Pides3 map, and Piodes3 map suitable for the premix combustion mode according to the engine rotational speed NE and the demand torque TRQ to calculate the third demand fresh air flow rate Giades3, the third demand intake pressure Pides3, and a third demand intake oxygen partial pressure Piodes3.

The switching block 106a selects one of the first-to-third demand intake oxygen partial pressures Piodes1, Piodes2, and Piodes3 according to the combustion mode parameter Mdcmb and outputs the selected one as the demand intake oxygen partial pressure Piodes. If Mdcmb is equal to "1", the first demand intake oxygen partial pressure Piodes1 is selected. If Mdcmb is equal to "2", the second demand intake oxygen partial pressure Piodes2 is selected. If Mdcmb is equal to "3", the third demand intake oxygen partial pressure Piodes3 is selected.

Figure 18:
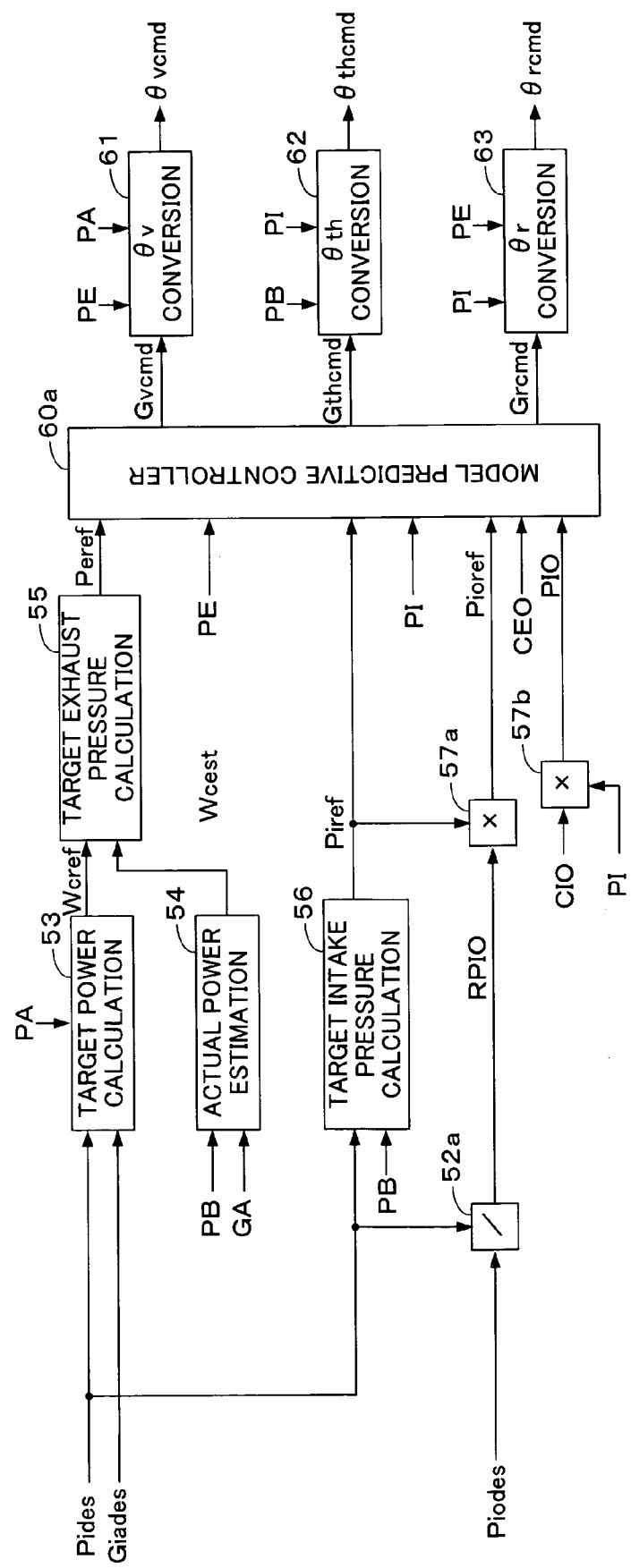
FIG. 18 is a block diagram showing a configuration of an intake gas state control block shown in FIG. 16.

The intake gas state control block 43a is configured as shown in FIG. 18. That is, the intake gas state control block 43a is obtained by deleting the demand recirculated gas partial pressure calculation block 51 and the subtracting block 58 in the intake gas state control block 43 shown in FIG. 4, changing the dividing block 52, the multiplying block 57, and the model predictive controller 60, respectively, to a dividing block 52a, a multiplying block 57a, and a model predictive controller 60a, and adding a multiplying block 57b.

The dividing block 52a divides the demand intake oxygen partial pressure Piodes by the demand intake pressure Pides to calculate a demand intake oxygen ratio RPIO. The multiplying block 57a multiplies the target intake pressure Piref by the demand intake oxygen ratio RPIO to calculate a target intake oxygen partial pressure Pioref. The multiplying block 57b multiplies the detected intake pressure PI by the detected intake oxygen concentration CIO to calculate an intake oxygen partial pressure PIO.

The target exhaust pressure Peref, the detected exhaust pressure PE, the target intake pressure Piref, the detected intake pressure PI, the target intake oxygen partial pressure Pioref, the detected intake oxygen partial pressure PIO, and the detected exhaust oxygen concentration CEO are supplied to the model predictive controller 60a. The model predictive controller 60a calculates the turbine gas flow rate command value Gvcmd, the fresh air flow rate command value Gthcmd, and the recirculated gas flow rate command value Grcmd using the model predictive control so that the detected exhaust pressure PE, the detected intake pressure PI, and the detected intake oxygen partial pressure PIO coincide, respectively, with the target exhaust pressure Peref, the target intake pressure Piref, and the target intake oxygen partial pressure Pioref.

Next, the model of the intake gas state control system in this embodiment is described below.

Regarding the intake pressure Pi, equation (201) is satisfied. Since the intake gas flow rate G'z is expressed by equation (24) (shown again), equation (202) is obtained by applying equation (24) to equation (201).

$$\frac{d}{dt}Pi = ki(G'th + G'r - G'z) \tag{201}$$

$$G'z = k'_{\eta v} \times Pi \tag{24}$$

$$\frac{d}{dt}Pi = -k'_{\eta v}ki \cdot Pi + ki(G'th + G'r) \tag{202}$$

Regarding the intake oxygen partial pressure Pio, equation (203) is satisfied. In equation (203), "Mio" is a mass of the oxygen in the intake pipe.

$$Pio \times Vi = Mio \times R \times Ti \tag{203}$$

By differentiating equation (203) with respect to time, equation (204) is obtained. Further, if a ratio of oxygen contained in air is expressed by "rao" and a ratio of oxygen contained in exhaust gases is expressed by "reo", equation (205) is satisfied. The oxygen ratio rao in air is a constant (0.232), and the detected exhaust oxygen concentration CEO is used as the oxygen ratio reo.

$$\frac{dPio}{dt} = \kappa n i \frac{RTi}{Vi} \frac{dMio}{dt} \tag{204}$$

$$\frac{dMio}{dt} = rao \cdot G'th + reo \cdot G'r - \frac{Pio}{Pi} \cdot G'z \tag{205}$$

By applying equations (205) and (24) to equation (204), equation (206) is obtained.

$$\frac{d}{dt}Pio = -k'_{\eta v}ki \cdot Pio + ki(rao \cdot G'th + reo \cdot G'r) \tag{206}$$

Regarding the exhaust pressure Pe, equation (28) (shown again) is satisfied. By applying equation (24) to equation (28), equation (207) is obtained.

$$\frac{d}{dt}Pe = ke(G'z - G'r - G'v) \tag{28}$$

$$\left(ke = \kappa ne \frac{RTe}{Ve}\right)$$

$$\frac{d}{dt}Pe = k'_{\eta v}ke \cdot Pi - ke(G'r + G'v) \tag{207}$$

By combining equations (202), (206), and (207), and converting the combined equation to an equation based on the crank angle α, equation (208), which defines the controlled object model, is obtained. Therefore, the control input u(k) is calculated based on equation (208) with the same method as the first embodiment described above.

$$\frac{d}{d\alpha}\begin{bmatrix} Pi \\ Pio \\ Pe \end{bmatrix} = \tag{208}$$

$$\begin{bmatrix} -k_{\eta v}ki & 0 & 0 \\ 0 & -k_{\eta v}ki & 0 \\ k_{\eta v}ke & 0 & 0 \end{bmatrix}\begin{bmatrix} Pi \\ Pio \\ Pe \end{bmatrix} + \begin{bmatrix} ki & ki & 0 \\ ki\cdot rao & ki\cdot reo & 0 \\ 0 & -ke & -ke \end{bmatrix}\begin{bmatrix} u_{th} \\ u_r \\ u_v \end{bmatrix}$$

$$\begin{bmatrix} u_{th} \\ u_r \\ u_v \end{bmatrix} = [\ Gth\ \ Gr\ \ Gv\ ]^T$$

Figure 19:
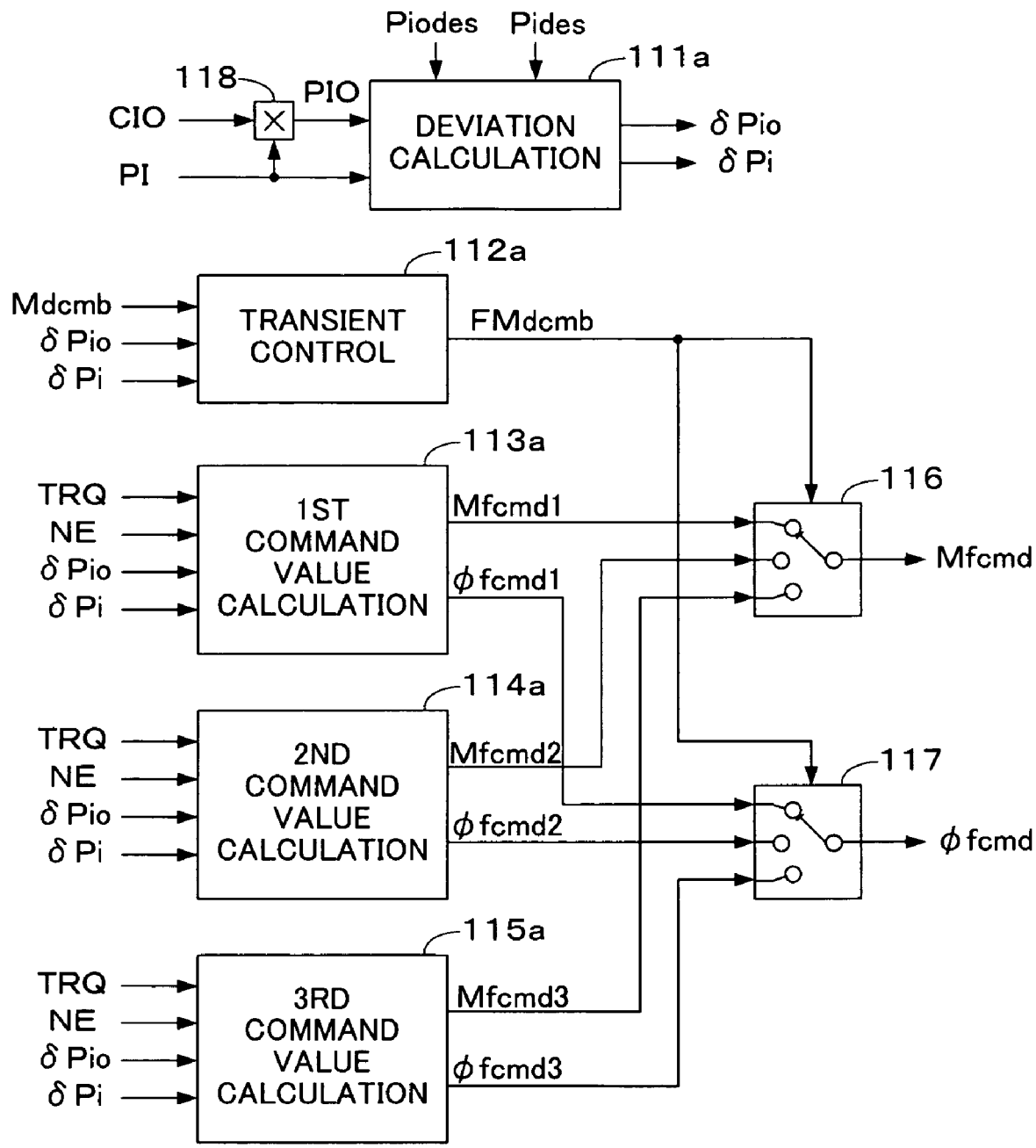
FIG. 19 is a block diagram showing a configuration of a fuel injection control block shown in FIG. 16.

FIG. 19 is a block diagram showing a configuration of the fuel injection control block 44a of FIG. 17. The fuel injection control block 44a includes a deviation calculation block 111a, a transient control block 112a, a first command value calculation block 113a, a second command value calculation block 114a, a third command value calculation block 115a, the switching blocks 116 and 117, and a multiplying block 118. The switching blocks 116 and 117 operate similarly as the blocks shown in FIG. 10.

The multiplying block 118 multiplies the intake oxygen concentration CIO by the intake pressure PI to calculate the intake oxygen partial pressure PIO. The deviation calculation block 111a calculates an intake oxygen partial pressure deviation δPio and the intake pressure deviation δPi by equations (211) and (212).

$$\delta Pio = PIO - Piodes \tag{211}$$

$$\delta Pi = PI - Pides \tag{212}$$

The transient control block 112a calculates the modified combustion mode parameter FMdcmb according to the combustion mode parameter Mdcmb, the intake oxygen partial pressure deviation δPio, and the intake pressure deviation δPi. When the operating condition of the engine 1 is in a steady state, the modified combustion mode parameter FMdcmb is equal to the combustion mode parameter Mdcmb. When the combustion mode parameter Mdcmb is changed (for example, when changed from "1" to "2"), the modified combustion mode parameter FMdcmb is maintained at the preceding value ("1") if at least one of the intake oxygen partial pressure deviation δPio and the intake pressure deviation δPi is equal to or greater than a predetermined deviation amount. When both of the intake oxygen partial pressure deviation δPio and the intake pressure deviation δPi become less than the corresponding predetermined deviation amounts, the modified combustion mode parameter FMdcmb is set to the changed combustion mode parameter Mdcmb ("2").

The first command value calculation block 113a calculates the first fuel injection amount Mfcmd1 and the first fuel injection timing φfcmd1 suitable for the lean combustion mode according to the demand torque TRQ, the engine rotational speed NE, the intake oxygen partial pressure deviation δPio, and the intake pressure deviation δPi. The second command value calculation block 114a calculates the second fuel injection amount Mfcmd2 and the second fuel injection timing φfcmd2 suitable for the rich combustion mode according to the demand torque TRQ, the engine rotational speed NE, the intake oxygen partial pressure deviation δPio, and the intake pressure deviation δPi. The third command value calculation block 115a calculates the third fuel injection amount Mfcmd3 and the third fuel injection timing φfcmd3 suitable for the premix combustion mode according to the demand torque TRQ, the engine rotational speed NE, the intake oxygen partial pressure deviation δPio, and the intake pressure deviation δPi.

Figure 20:
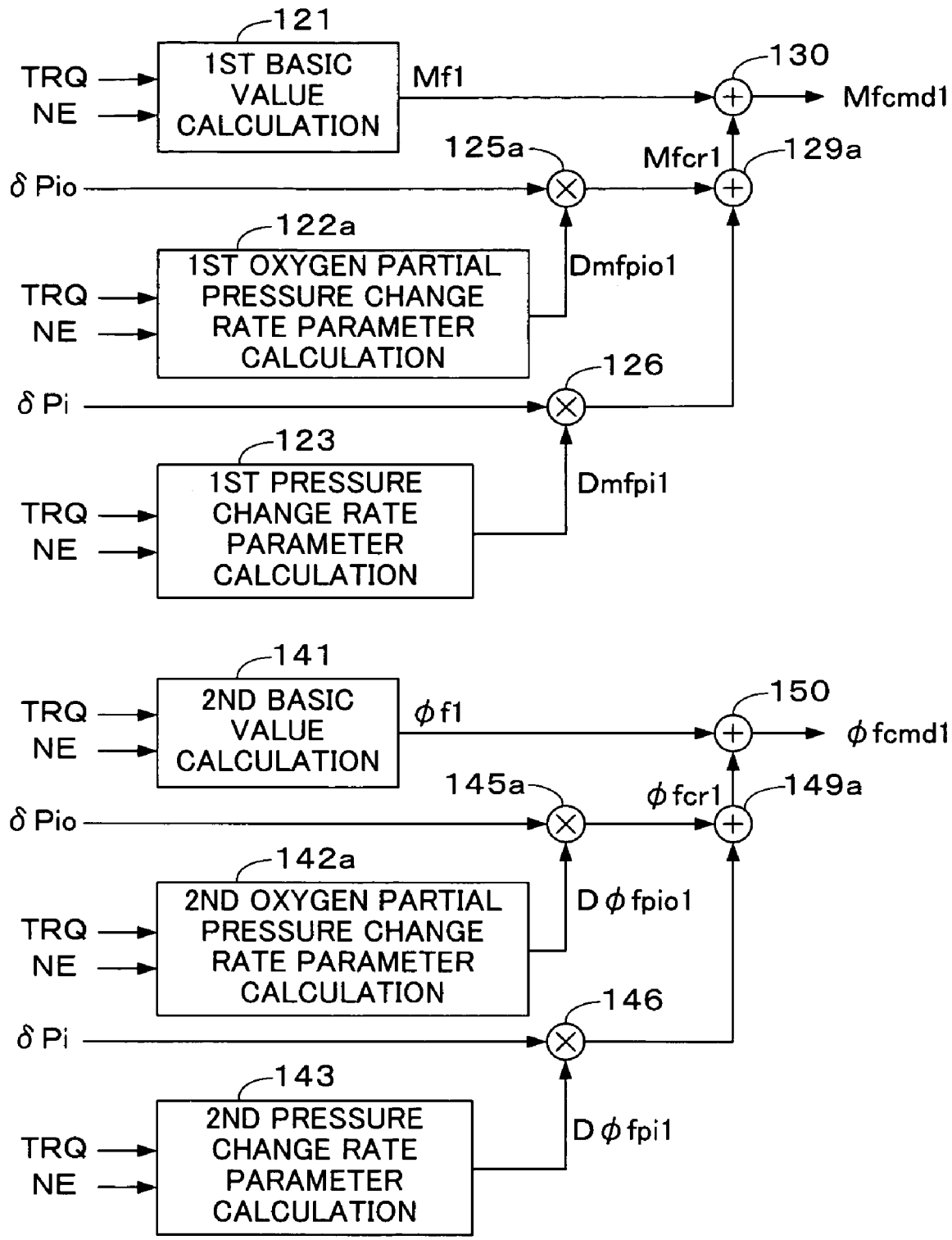
FIG. 20 is a block diagram showing a first command value calculation block shown in FIG. 19.

FIG. 20 is a block diagram showing a configuration of the first command value calculation block 113a. The first command value calculation block 113a includes the first and second basic value calculation blocks 121 and 141; first and second oxygen partial pressure change rate parameter calculation blocks 122a and 142a; first and second pressure change rate parameter calculation blocks 123 and 143; multiplying blocks 125a, 126, 145a, and 146; and adding blocks 129a, 130, 149a, and 150. The blocks with the same reference numerals of the blocks shown in FIG. 11 have the same function as the blocks shown in FIG. 11, wherein only the differences between the two embodiments will be described below.

The first oxygen partial pressure change rate parameter calculation block 122a retrieves a Dmfpio1 map according to the demand torque TRQ and the engine rotational speed NE to calculate a first oxygen partial pressure change rate parameter Dmfpio1. In the above-described Dmfpio1 map, values suitable for the lean combustion mode are set, and grid points of the map defined by the demand torque TRQ and the engine rotational speed NE are set to be the same as the grid points of the map used in the first demand value setting block 101a.

The multiplying block 125a multiplies the first oxygen partial pressure change rate parameter Dmfpio1 by the intake oxygen partial pressure deviation δPio. The adding block 129a adds the outputs of the multiplying blocks 125a and 126 to calculate the first fuel injection amount correction value Mfcr1.

The second oxygen partial pressure change rate parameter calculation block 142a retrieves a Dφfpio1 map according to the demand torque TRQ and the engine rotational speed NE to calculate a second oxygen partial pressure change rate parameter Dφfpio1. In the above-described Dφfpio1 map, values suitable for the lean combustion mode are set, and grid points of the map defined by the demand torque TRQ and the engine rotational speed NE are set to be the same as the grid points of the map used in the first demand value setting block 101a.

The multiplying block 145a multiplies the second oxygen partial pressure change rate parameter Dφfpio1 by the intake oxygen partial pressure deviation δPio. The adding block 149a adds the outputs of the multiplying blocks 145a and 146 to calculate the first fuel injection timing correction value φfcr1.

Therefore, the calculations of the first fuel injection amount Mfcmd1 and the first fuel injection timing φfcmd1 in the first command value calculation block 113a are, respectively, expressed by equations (213) and (214).

$$Mfcmd1 = Mf1 + Mfcr1 \tag{213}$$
$$= Mf1 + \delta Pio \times Dmfpio1 + \delta Pi \times Dmfpi1$$

-continued $$\phi fcmd1 = \phi f1 + \phi fcr1 \quad (214)$$
$$= \phi f1 + \delta Pio \times D\phi fpio1 + \delta Pi \times D\phi fpi1$$

The second command value calculation block 114a and the third command value calculation block 115a shown in FIG. 19 are configured similarly to the first command value calculation block 113a. The second fuel injection amount Mfcmd2, the second fuel injection timing φfcmd2, the third fuel injection amount Mfcmd3, and the third fuel injection timing φfcmd3 are, respectively, calculated by equations (215)-(218).

$$Mfcmd2 = Mf2 + Mfcr2 \quad (215)$$
$$= Mf2 + \delta Pio \times Dmpio2 + \delta Pi \times Dmfpi2$$

$$\phi fcmd2 = \phi f2 + \phi fcr2 \quad (216)$$
$$= \phi f2 + \delta Pio \times D\phi pio2 + \delta Pi \times D\phi fpi2$$

$$Mfcmd3 = Mf3 + Mfcr3 \quad (217)$$
$$= Mf3 + \delta Pio \times Dmpio3 + \delta Pi \times Dmfpi3$$

$$\phi fcmd3 = \phi f3 + \phi fcr3 \quad (218)$$
$$= \phi f3 + \delta Pio \times D\phi pio3 + \delta Pi \times D\phi fpi3$$

Figure 21:
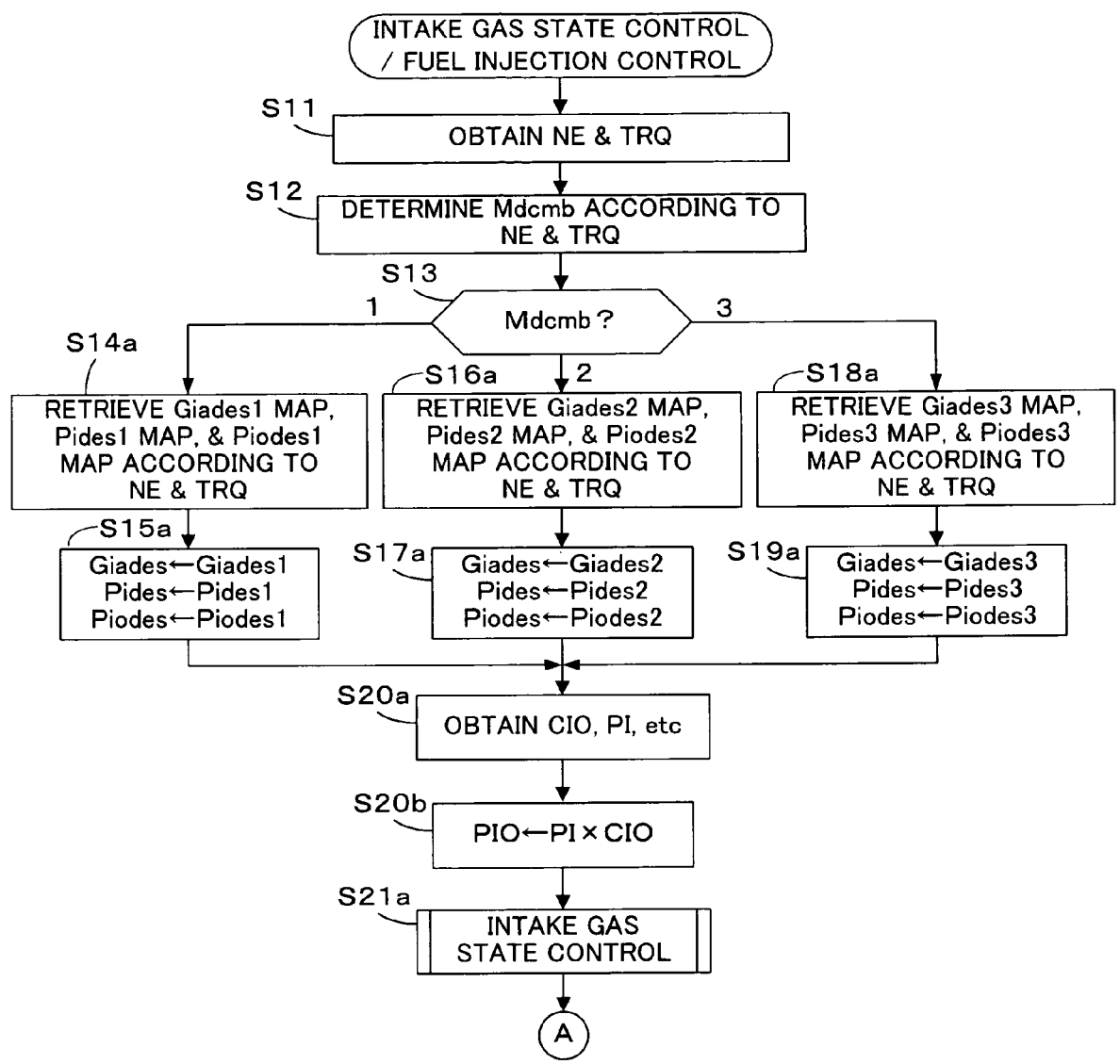
FIG. 21 is a flowchart of a process for performing intake gas state control and fuel injection control.
Figure 22:
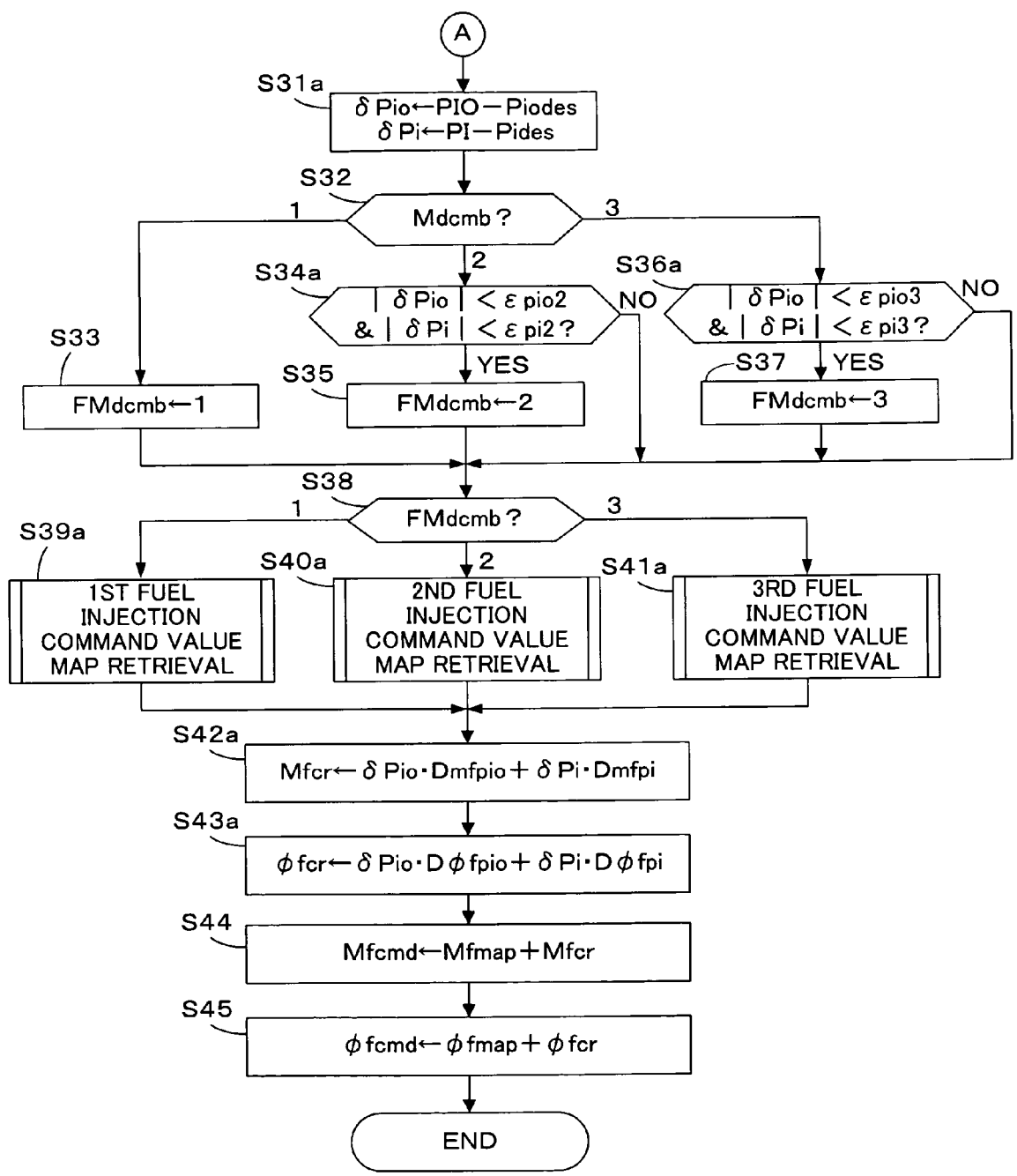
FIG. 22 is a flowchart of a process for performing intake gas state control and fuel injection control.

FIGS. 21 and 22 show a flowchart of a process for executing the intake gas state control and the fuel injection control described above. The process is obtained by replacing steps S14-S21, S31, S34, S36, and S39-S43 of the process shown in FIGS. 12 and 13, respectively, with steps S14a-S21a, S31a, S34a, S36a, and S39a-S43a, and adding step S20b.

In step S14a, the Giades1 map, the Pides1 map, and the Piodes1 map are retrieved according to the engine rotational speed NE and the demand torque TRQ to calculate the first demand fresh air flow rate Giades1, the first demand intake pressure Pides1, and a first demand intake oxygen partial pressure Piodes1. Subsequently, the demand fresh air flow rate Giades, the demand intake pressure Pides, and the demand intake oxygen partial pressure Piodes are, respectively, set to the calculated values of the first demand fresh air flow rate Giades1, the first demand intake pressure Pides1, and the first demand intake oxygen partial pressure Piodes1 (step S15a).

In step S16a, the Giades2 map, the Pides2 map, and the Piodes2 map are retrieved according to the engine rotational speed NE and the demand torque TRQ to calculate the second demand fresh air flow rate Giades2, the second demand intake pressure Pides2, and a second demand intake oxygen partial pressure Piodes2. Subsequently, the demand fresh air flow rate Giades, the demand intake pressure Pides, and the demand intake oxygen partial pressure Piodes are, respectively, set to the calculated values of the second demand fresh air flow rate Giades2, the second demand intake pressure Pides2, and the second demand intake oxygen partial pressure Piodes2 (step S17a).

In step S18a, the Giades3 map, the Pides3 map, and the Piodes3 map are retrieved according to the engine rotational speed NE and the demand torque TRQ to calculate the third demand fresh air flow rate Giades3, the third demand intake pressure Pides3, and a third demand intake oxygen partial pressure Piodes3. Subsequently, the demand fresh air flow rate Giades, the demand intake pressure Pides, and the demand intake oxygen partial pressure Piodes are, respectively, set to the calculated values of the third demand fresh air flow rate Giades3, the third demand intake pressure Pides3, and the third demand intake oxygen partial pressure Piodes3 (step S19a).

In step S20a, the detected parameters, such as the intake oxygen concentration CIO and the intake pressure PI, are obtained. In step S21a, the intake oxygen partial pressure PIO is calculated by multiplying the intake oxygen concentration CIO by the intake pressure PI.

In step S21a, the intake gas state control described with reference to FIG. 18 is performed, and the vane opening command value θvcmd, the throttle valve opening command value θthcmd, and the EGR valve opening command value θrcmd are calculated.

Next, in step S31a of FIG. 22, the intake oxygen partial pressure deviation δPio and the intake pressure deviation δPi are calculated.

In step S34a, it is determined whether the absolute value of the intake oxygen partial pressure deviation δPio is less than a 5th predetermined threshold value εpio2 (for example, 0.05×Piodes), and the absolute value of the intake pressure deviation δPi is less than the second predetermined threshold value εpi2 (for example, 0.05×Pides). If the answer to step S34a is negative (NO), i.e., when |δPio| is greater than or equal to εpio2, or |δPi| is greater than or equal to εpi2, the process proceeds to step S38 without changing the value of the modified combustion mode parameter FMdcmb (holding the preceding value). On the other hand, if the answer to step S34a is affirmative (YES), the modified combustion mode parameter FMdcmb is set to "2" (step S35) and the process proceeds to step S38.

In step S36a, it is determined whether the absolute value of the intake oxygen partial pressure deviation δPio is less than a 6th predetermined threshold value εpio3 (for example, 0.05×Piodes), and the absolute value of the intake pressure deviation δPi is less than the 4th predetermined threshold value εpi3 (for example, 0.05×Pides). If the answer to step S36a is negative (NO), i.e., when |δPio| is greater than or equal to εpio3, or |δPi| is greater than or equal to εpi3, the process proceeds to step S38 without changing the value of the modified combustion mode parameter FMdcmb (holding the preceding value). On the other hand, if the answer to step S36a is affirmative (YES), the correction combustion mode parameter FMdcmb is set to "3" (step S37) and the process proceeds to step S38.

A first fuel injection command value map retrieval process corresponding to the lean combustion mode is performed in step S39a. A second fuel injection command value map retrieval process corresponding to the rich combustion mode is performed in step S40a. Finally, a third fuel injection command value map retrieval process corresponding to the premix combustion mode is performed in step S41a.

Figure 23:
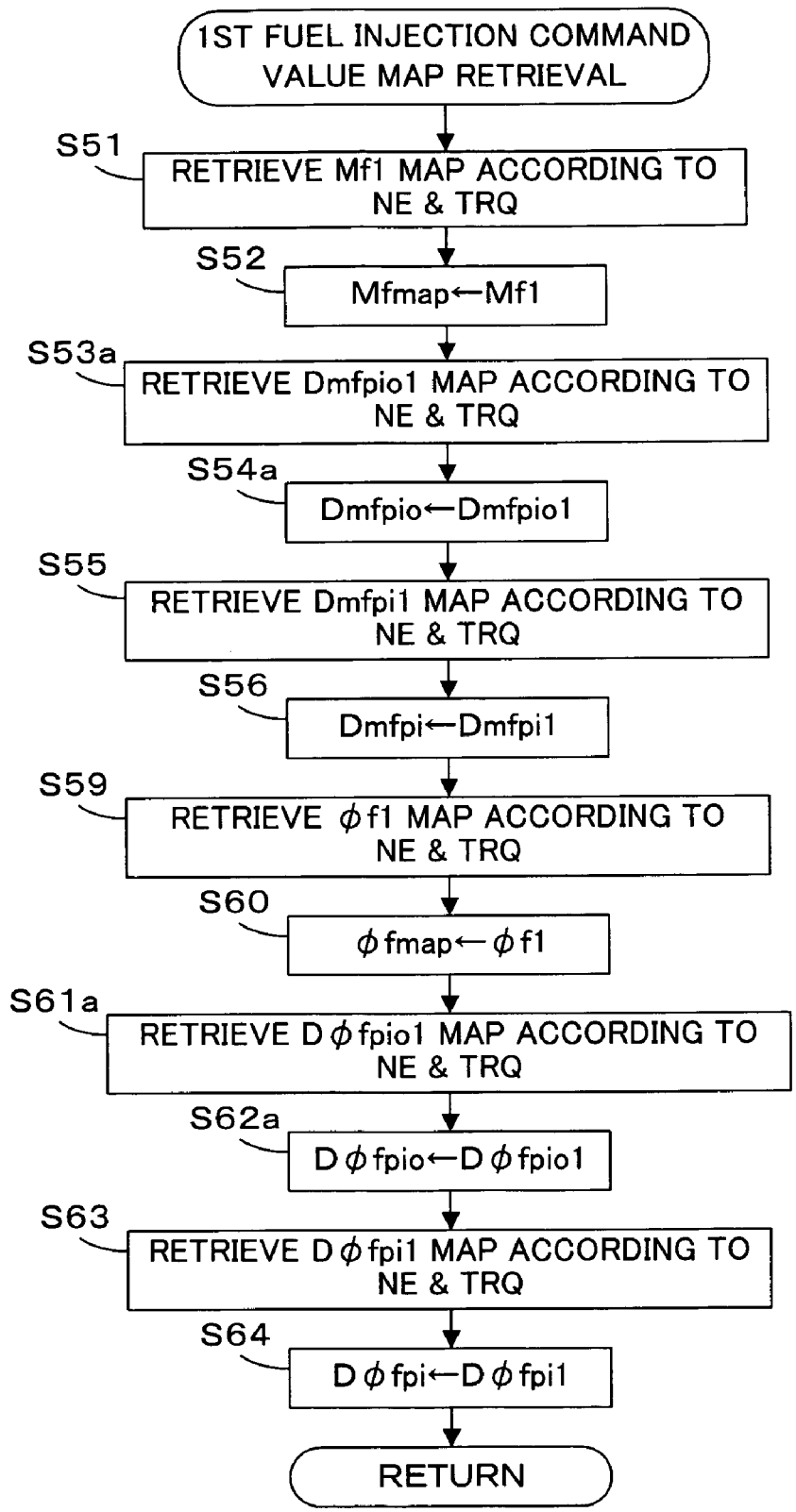
FIG. 23 is a flowchart of a first fuel injection command value map of a retrieval process executed in the process of FIG. 22.

FIG. 23 is a flowchart of the retrieval process performed in step S39a. The process is obtained by replacing steps S53, S54, S61, and S62 of the process shown in FIG. 14, respectively, with steps S53a, S54a, S61a, and S62a, and deleting steps S57, S58, S65, and S66.

In step S53a, the Dmfpio1 map is retrieved according to the engine rotational speed NE and the demand torque TRQ to calculate a first oxygen partial pressure change rate parameter Dmfpio1, and the oxygen partial pressure change rate parameter Dmfpio is set to the first oxygen partial pressure change rate parameter Dmfpio1 (step S54a).

In step S61a, the Dϕfpio1 map is retrieved according to the engine rotational speed NE and the demand torque TRQ to calculate a second oxygen partial pressure change rate parameter Dϕfpio1. The oxygen partial pressure change rate parameter Dϕfpio is set to the second oxygen partial pressure change rate parameter Dϕfpio1 in step S62a.

In the process of FIG. 23, the basic fuel injection amount Mfmap, the first oxygen partial pressure change rate parameter Dmfpio, the first pressure change rate parameter Dmfpi, the basic fuel injection timing ϕfmap, the second oxygen partial pressure change rate parameter Dϕfpio, and the second pressure change rate parameter Dϕfpi suitable for the lean combustion mode are calculated.

Referring back to FIG. 22, the second fuel injection command value map retrieval process and the third fuel injection command value map retrieval process in steps S40a and S41a are configured similarly to the first fuel injection command value map retrieval process shown in FIG. 23. That is, in the second fuel injection command value map retrieval process, the basic fuel injection amount Mfmap, the first oxygen partial pressure change rate parameter Dmfpio, the first pressure change rate parameter Dmfpi, the basic fuel injection timing ϕfmap, the second oxygen partial pressure change rate parameter Dϕfpio, and the second pressure change rate parameter Dϕfpi suitable for the rich combustion mode are calculated. In the third fuel injection command value map retrieval process, the basic fuel injection amount Mfmap, the first oxygen partial pressure change rate parameter Dmfpio, the first pressure change rate parameter Dmfpi, the basic fuel injection timing ϕfmap, the second oxygen partial pressure change rate parameter Dϕfpio, and the second pressure change rate parameter Dϕfpi suitable for the premix combustion mode are calculated.

In step S42a, the fuel injection amount correction value Mfcr is calculated by equation (219). In step S43a, the fuel injection timing correction value ϕfcr is calculated by equation (220).

$$Mfcr = \delta Pio \times Dmfpio + \delta Pi \times Dmfpi \quad (219)$$

$$\Phi fcr = \delta Pio \times D\phi fpio + \delta Pi \times D\phi fpi \quad (220)$$

As described above, in this embodiment, the intake pressure PI and the intake oxygen partial pressure PIO (intake oxygen concentration CIO) are detected as the intake gas state parameter. Also, the demand values of the intake gas state parameters, i.e., the demand intake pressure Pides and the demand intake oxygen partial pressure Piodes, are calculated according to the engine rotational speed NE and the demand torque TRQ which indicate the engine operating condition. The intake gas state is controlled so that the intake pressure PI and the intake oxygen partial pressure PIO coincide, respectively, with the demand intake pressure Pides and the demand intake oxygen partial pressure Piodes. Further, the fuel injection amount command value Mfcmd and the fuel injection timing command value ϕfcmd are calculated according to the engine rotational speed NE, the demand torque TRQ, and the deviations of the intake pressure PI and the intake oxygen partial pressure PIO from the corresponding demand values (Pides, Piodes). The fuel injection valve 9 is then controlled according to the calculated command values. Therefore, the desired intake gas state according to the engine operating condition is realized, and the control of the fuel injection amount and the fuel injection timing suitable for the intake gas state is performed, wherein good engine operating performance and good exhaust characteristics are obtained.

Specifically, the basic fuel injection amount Mfmap and the basic fuel injection timing ϕfmap are calculated according to the engine rotational speed NE and the demand torque TRQ. The first pressure change rate parameter Dmfpi and the first oxygen partial pressure change rate parameter Dϕfpio, which indicate the change rate of the basic fuel injection amount Mfmap, are calculated according to the engine rotational speed NE and the demand torque TRQ. Further, the second pressure change rate parameter Dϕfpi and the second oxygen partial pressure change rate parameter Dϕfpio, which indicate the change rate of the basic fuel injection timing ϕfmap, are calculated according to the engine rotational speed NE and the demand torque TRQ. Further, the correction values Mfcr and ϕfcr are calculated by multiplying the intake pressure deviation δPi and the oxygen partial pressure deviation δPio, which indicate the deviations of the detected intake gas state parameters from the demand values, by the corresponding change rate parameters (Dmfpi, Dmfpio, Dϕfpi, and Dϕfpio), and adding the products of the multiplications. The correction values Mfcr and ϕfcr are, respectively, added to the basic fuel injection amount Mfmap and the basic fuel injection timing ϕfmap to calculate the fuel injection amount command value Mfcmd and the fuel injection timing command value ϕfcmd. Subsequently, the fuel injection control is performed based on the calculated command values. Therefore, even if the intake gas state parameters PI and PIO do not completely coincide with the corresponding demand values, appropriate command values of the fuel injection amount and the fuel injection timing are obtained according to the deviations δPi and δPio and accurate fuel injection control is performed. Further, since the correction values Mfcr and ϕfcr are calculated by multiplying the change rate parameters by the deviations δPi and δPio, the number of set-points in the maps for calculating the fuel injection amount and the fuel injection timing suitable for the actual intake gas state parameter values, is reduced. Accordingly, accurate fuel injection control is realized, and memory capacity and manpower for setting the maps are suppressed.

In this embodiment, the intake pressure sensor 24 and the intake oxygen concentration sensor 30 correspond to the intake gas state parameter detecting means. The throttle valve 3, the EGR valve 6, and the movable vane 12 correspond to a part of the intake gas state control means, and the ECU 20 corresponds to the combustion mode determining means, the demand value calculating means, a portion of the intake gas state control means, and the fuel injection control means. Specifically, the combustion mode determination block 41 corresponds to the combustion mode determining means, the intake gas state parameter demand value setting block 42a corresponds to the demand value calculating means, the intake gas state control block 43a corresponds to a portion of the intake gas state control means, and the fuel injection control block 44a corresponds to the fuel injection control means.

The present invention is not limited to the embodiments described above, and various modifications may be made thereto. For example, in the first embodiment, the intake pressure PI, the recirculated gas flow rate GR and the intake gas temperature TI, or the intake air flow rate GA (intake fresh air flow rate), the recirculated gas flow rate GR, and the intake gas temperature TI may be used as the intake gas state parameters. Further, in the second embodiment, the intake pressure PI and a partial pressure PII of the inert gases in the intake gases, or the intake oxygen partial pressure PIO and the inert gas partial pressure PII may be used as the intake gas state parameters. Also, inert gases can be the gases contained in the intake gases other than oxygen.

The reason why the fuel injection control is appropriately performed using the intake gas state parameters is described below.

In order to appropriately perform the fuel injection control, it is necessary to control an oxygen mass Mo and an inert gas mass Mi in the combustion chamber to desired values. The intake pressure PI is equal to the sum of the intake oxygen partial pressure PIO and the intake inert gas partial pressure PII, as shown in equation (301).

$$PI = PIO + PII \tag{301}$$

The total gas mass Mt in the combustion chamber is equal to the sum of the oxygen mass Mo and the inert gas mass Mi in the combustion chamber. Further, if the relationship of the above-described equation (20) (PV=MRT) and the volumetric efficiency of the engine are taken into consideration, the intake pressure PI, the intake oxygen partial pressure PIO, and the intake inert gas partial pressure PII can be expressed by equations (302)-(304).

$$PI = kEV \times Mt \tag{302}$$

$$PIO = kEV \times Mo \tag{303}$$

$$PII = kEV \times Mi \tag{304}$$

where kEV is a coefficient calculated in view of the relationship of equation (20) and the volumetric efficiency of the engine.

Therefore, in order to control the oxygen mass Mo and the inert gas mass Mi to the corresponding desired values, any two of the intake pressure PI, the intake oxygen partial pressure PIO, and the intake inert gas partial pressure PII may be controlled to the corresponding demand values. This is because if any two are determined, the remaining one will be determined from the relationship of equation (301).

The intake inert gas partial pressure PII can be obtained by subtracting the detected intake oxygen partial pressure PIO from the detected intake pressure PI.

On the other hand, the intake pressure PI can also be expressed by a sum of the fresh air partial pressure PIA and the recirculated gas partial pressure PIR as shown in equation (305).

$$PI = PIA + PIR \tag{305}$$

Further, the intake oxygen partial pressure PIO and the intake inert gas partial pressure PII can be expressed by equations (306) and (307). "reo" and "rao" in these equations are an oxygen ratio in the exhaust gases, and an oxygen ratio in the air, respectively.

$$PIO = reo \times PIR + rao \times PIA \tag{306}$$

$$PII = (1-reo) \times PIR + (1-rao) \times PIA \tag{307}$$

If the relationships shown by equations (305)-(307) are used, the oxygen mass Mo and the inert gas mass Mi can be controlled to the corresponding desired values by controlling any two of the intake pressure PI, the fresh air partial pressure PIA, and the recirculated gas partial pressure PIR. That is, any two of the intake pressure PI, the fresh air partial pressure PIA, and the recirculated gas partial pressure PIR may be adopted as the intake gas state parameters.

However, since it is rather difficult to directly detect the fresh air partial pressure PIA and the recirculated gas partial pressure PIR, it is preferable to use the fresh air flow rate, i.e., the intake air flow rate GA, and the recirculated gas flow rate GR, which are detectable parameters relating to the fresh air partial pressure PIA and the recirculated gas partial pressure PIR. Since the intake pressure PI, the fresh air partial pressure PIA, and the recirculated gas partial pressure PIR can be expressed by equations (308)-(310) (refer to equations (24) and (26)), the intake air flow rate GA and the recirculated gas flow rate GR can be used alternatively as the intake gas state parameters.

$$PI = k_{\eta} v \times GZ \tag{308}$$

$$PIA = k_{\eta} v \times GA \tag{309}$$

$$PIR = k_{\eta} v \times GR \tag{310}$$

In equation (308), GZ is an intake gas flow rate obtained by adding the intake air flow rate GA and the recirculated gas flow rate GR. The recirculated gas flow rate GR in equation (310) can be calculated by subtracting the intake air flow rate GA from the intake gas flow rate GZ calculated using the relationship of equation (308).

In the above-described embodiments, examples where the present invention is applied to the control of a diesel internal combustion engine are shown. The present invention is applicable also to a gasoline internal combustion engine. With respect to the gasoline internal combustion engine, the present invention is also applicable to an engine in which fuel is injected into the intake pipe.

The present invention can be applied to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all modifications which come within the meaning and range of equivalency of the claims are, therefore, to be embraced therein.

What is claimed is:

1. A control system for an internal combustion engine having fuel injection means for injecting fuel to an intake pipe or a combustion chamber of said engine, comprising:

intake gas state parameter detecting means for detecting intake gas state parameters indicative of a state of intake gases supplied to said engine;

demand value calculating means for calculating demand values of the intake gas state parameters according to operating condition parameters indicative of an operating condition of said engine;

intake gas state control means for controlling the intake gas state so that the intake gas state parameters coincide with the demand values; and fuel injection control means for calculating a control value according to the operating condition parameters and deviations of the intake gas state parameters from the demand values, and for controlling an amount of fuel injected by said fuel injection means according to the control value.

2. The control system according to claim 1, wherein said fuel injection control means controls a fuel injection timing of said fuel injection means according to the operating condition parameters and the deviations of the intake gas state parameters from the demand values.

3. The control system according to claim 1, wherein said fuel injection control means comprises:

basic control value calculating means for calculating a basic control value according to the operating condition parameters;

change rate parameter calculating means for calculating change rate parameters indicative of change rates of the basic control value according to the operating condition parameters;

correction value calculating means for calculating correction values by multiplying the change rate parameters by the deviations of the intake gas state parameters from the demand values; and control value calculating means for calculating the control value of the fuel injection amount by correcting the basic control value with the correction values, wherein said fuel injection control means performs the fuel injection control according to the control value calculated by said control value calculating means.

4. The control system for an internal combustion engine according to claim 1, wherein the intake gas state parameters are any two of an intake pressure, an intake oxygen partial pressure, and an intake inert gas partial pressure.

5. The control system according to claim 1, wherein said engine comprises an exhaust gas recirculation mechanism for recirculating exhaust gases to said intake pipe, and the intake gas state parameters are any two of an intake pressure, an intake fresh air flow rate, and a flow rate of recirculated exhaust gases.

6. The control system according to claim 4, wherein an intake gas temperature is further included in the intake gas state parameters, wherein said control system further comprises intake gas temperature reference value calculating means for calculating a reference value of the intake gas temperature, and wherein said fuel injection control means performs the fuel injection control according to a deviation of a detected intake gas temperature from the reference value.

7. The control system according to claim 1, further comprising combustion mode determining means for determining a combustion mode of said engine according to the operating condition parameters, wherein said fuel injection control means calculates the control value using a control map set corresponding to the combustion mode.

8. The control system according to claim 7, wherein when said combustion mode determining means changes the combustion mode, said fuel injection control means uses the control map corresponding to the combustion mode before the combustion mode is changed if at least one of absolute values of the deviations is equal to or greater than a predetermined threshold value, and said fuel injection control means uses the control map corresponding to the changed combustion mode if each of the absolute values of the deviations is less than the predetermined threshold value.

9. The control system according to claim 1, wherein said engine has a throttle valve disposed in said intake pipe, an exhaust gas recirculation mechanism for recirculating exhaust gases to said intake pipe, and a turbo charger having a compressor wheel and a turbine wheel, said exhaust gas recirculation mechanism including an exhaust gas recirculation passage and an exhaust gas recirculation control valve in said exhaust gas recirculation passage, said turbo charger including movable vanes for changing a flow rate of exhaust gases injected to said turbine wheel, wherein said intake gas state control means controls the intake gas state by changing openings of said throttle valve, exhaust gas recirculation control valve, and movable vanes.

10. The control system according to claim 9, wherein said intake gas state control means controls the intake gas state using a model predictive control.

11. The control system according to claim 10, wherein a controlled object model used in the model predictive control is defined using, as control inputs, a mass flow rate of gases passing through said movable vanes, a mass flow rate of gases passing through said exhaust gas recirculation control valve, and a mass flow rate of fresh air passing through said throttle valve.

12. A control method for an internal combustion engine having at least one fuel injection valve for injecting fuel to an intake pipe or a combustion chamber of said engine, said control method comprising the steps of:

a) detecting intake gas state parameters indicative of a state of intake gases supplied to said engine;

b) calculating demand values of the intake gas state parameters according to operating condition parameters indicative of an operating condition of said engine;

c) controlling the intake gas state so that the intake gas state parameters coincide with the demand values;

d) calculating a control value according to the operating condition parameters and deviations of the intake gas state parameters from the demand values; and e) controlling an amount of fuel injected by said at least one fuel injection valve according to the control value.

13. The control method according to claim 12, wherein a fuel injection timing of said at least one fuel injection valve is controlled according to the operating condition parameters and the deviations of the intake gas state parameters from the demand values.

14. The control method according to claim 12, wherein said step d) includes the steps of:

i) calculating a basic control value according to the operating condition parameters;

ii) calculating change rate parameters indicative of change rates of the basic control value according to the operating condition parameters;

iii) calculating correction values by multiplying the change rate parameters by the deviations of the intake gas state parameters from the demand values; and iv) calculating a control value of the fuel injection amount by correcting the basic control value with the correction values, wherein the fuel injection control is performed according to the calculated control value.

15. The control method according to claim 12, wherein the intake gas state parameters are any two of an intake pressure, an intake oxygen partial pressure, and an intake inert gas partial pressure.

16. The control method according to claim 12, wherein said engine comprises an exhaust gas recirculation mechanism for recirculating exhaust gases to said intake pipe, and the intake gas state parameters are any two of an intake pressure, an intake fresh air flow rate, and a flow rate of recirculated exhaust gases.

17. The control method according to claim 15, wherein an intake gas temperature is further included in the intake gas state parameters, wherein said control method further includes the step of calculating a reference value of the intake gas temperature, and wherein the fuel injection control is performed according to a deviation of a detected intake gas temperature from the reference value.

18. The control method according to claim 12, further comprising the step of determining a combustion mode of said engine according to the operating condition parameters, wherein the control value is calculated using a control map set corresponding to the combustion mode.

19. The control method according to claim 18, wherein when the combustion mode is changed, the control map corresponding to the combustion mode before the combustion mode is changed is used if at least one of absolute values of the deviations is equal to or greater than a predetermined threshold value, and the control map corresponding to the changed combustion mode is used if each of the absolute values of the deviations is less than the predetermined threshold value.

20. The control method according to claim 12, wherein said engine has a throttle valve disposed in said intake pipe, an exhaust gas recirculation mechanism for recirculating exhaust gases to said intake pipe, and a turbo charger having a compressor wheel and a turbine wheel, said exhaust gas recirculation mechanism including an exhaust gas recirculation passage and an exhaust gas recirculation control valve in said exhaust gas recirculation passage, said turbo charger including movable vanes for changing a flow rate of exhaust gases injected to said turbine wheel, wherein the intake gas state is controlled by changing openings of said throttle valve, exhaust gas recirculation control valve, and movable vanes.

21. The control method according to claim 20, wherein the intake gas state is controlled using a model predictive control.

22. The control method according to claim 21, wherein a controlled object model used in the model predictive control is defined using, as control inputs, a mass flow rate of gases passing through said movable vanes, a mass flow rate of gases passing through said exhaust gas recirculation control valve, and a mass flow rate of fresh air passing through said throttle valve.

* * * * *